United States Patent
Savage et al.

(10) Patent No.: US 10,527,462 B2
(45) Date of Patent: Jan. 7, 2020

(54) ENCODER AND METHOD OF USING THE SAME

(71) Applicant: MARQUARDT MECHATRONIK GMBH, Rietheim-Weilheim (DE)

(72) Inventors: Daniel Savage, Cazenovia, NY (US); Matthew R. Randle, Cazenovia, NY (US); Kenneth L. Markowski, Cazenovia, NY (US)

(73) Assignee: Marquardt GmbH, Rietheim-Weilheim (DE)

( * ) Notice: Subject to any disclaimer, the term of this patent is extended or adjusted under 35 U.S.C. 154(b) by 126 days.

(21) Appl. No.: 15/346,041

(22) Filed: Nov. 8, 2016

(65) Prior Publication Data

US 2018/0010931 A1  Jan. 11, 2018

Related U.S. Application Data

(60) Provisional application No. 62/359,963, filed on Jul. 8, 2016.

(51) Int. Cl.
*G01D 5/34* (2006.01)
*G01D 5/347* (2006.01)

(52) U.S. Cl.
CPC .................................. *G01D 5/347* (2013.01)

(58) Field of Classification Search
CPC .............. G01D 5/347; G01D 5/34707; G01D 5/34715; G01D 5/3473; G01D 5/34776
USPC ..... 250/231.13, 231.14, 231.18; 33/706, 707
See application file for complete search history.

(56) References Cited

U.S. PATENT DOCUMENTS

| | | | |
|---|---|---|---|
| 5,444,613 A * | 8/1995 | Tani ..................... | G01D 5/2495 318/640 |
| 5,453,728 A | 9/1995 | Zimmermann et al. | |
| 5,574,445 A * | 11/1996 | Maresca ................ | G01B 7/003 341/10 |
| 6,100,822 A | 8/2000 | Liu | |

(Continued)

FOREIGN PATENT DOCUMENTS

CN    101443870        5/2009
DE  10 2013 008 972   12/2013

(Continued)

OTHER PUBLICATIONS

U.S. Appl. No. 15/183,233, filed Jun. 15, 2016, Randle et al.

*Primary Examiner* — Kevin K Pyo
(74) *Attorney, Agent, or Firm* — Burr & Brown, PLLC

(57) ABSTRACT

An encoder, comprising a first element, a second element, and a plurality of components, in which the first element is movable among a plurality of positions relative to the second element, each position is adjacent to at least one other position, each component generates a signal at each of said positions, and movement of the first element from any position to any adjacent position results in a change in a signal from only one of said components. Also, an encoder that comprises a multi-detector element which comprises two or more sub-detectors that generate sub-signals, the sub-detectors spaced from each other a distance (rotational and/or translational) that is smaller than a distance between two positions of a first element. Also, a method of detecting a position of a first element relative to a second element, comprising moving a first element relative to a second element from a first position to a second position.

14 Claims, 19 Drawing Sheets

(56) References Cited

U.S. PATENT DOCUMENTS

| | | | |
|---|---|---|---|
| 7,015,688 B2 | 3/2006 | Wolber et al. | |
| 7,034,523 B2 | 4/2006 | Fahrlander et al. | |
| 7,362,242 B2 * | 4/2008 | Igarashi | G01D 11/30 341/13 |
| 7,714,272 B2 | 5/2010 | Urabe | |
| 8,186,240 B2 | 5/2012 | Sakai et al. | |
| 8,909,489 B2 | 12/2014 | Saruki et al. | |
| 9,121,694 B2 | 9/2015 | Mori et al. | |
| 2009/0084214 A1 | 4/2009 | Sakai et al. | |

FOREIGN PATENT DOCUMENTS

| | | |
|---|---|---|
| EP | 2856485 | 4/2015 |
| KR | 20140080771 | 7/2014 |
| KR | 2014/0095622 | 8/2014 |
| WO | 2013/178357 | 12/2013 |

\* cited by examiner

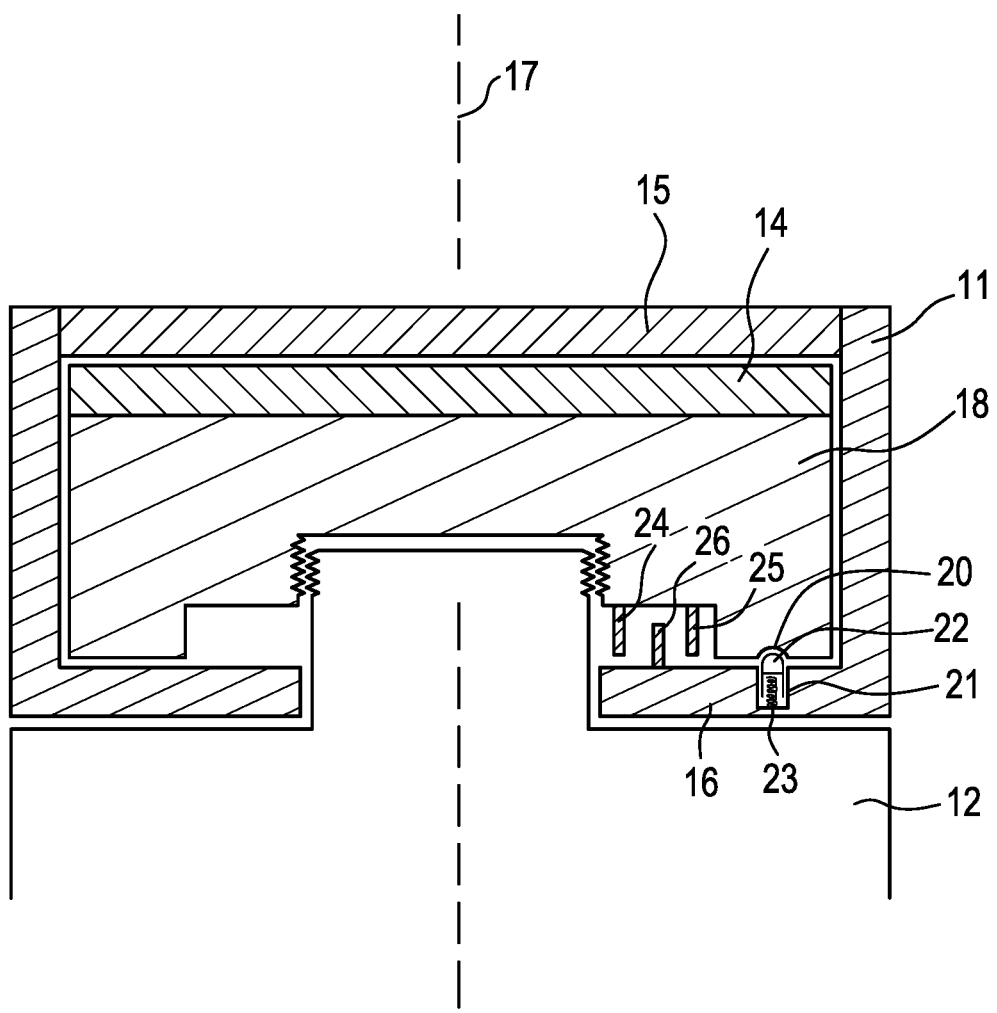

ENCODER AND METHOD OF USING THE SAME

CROSS-REFERENCE TO RELATED APPLICATIONS

This application claims the benefit of U.S. Provisional Patent Application No. 62/359,963, filed Jul. 8, 2016, the entirety of which is incorporated herein by reference as if set forth in its entirety.

FIELD OF THE INVENTIVE SUBJECT MATTER

In one aspect, the present inventive subject matter is directed to an encoder. The encoders in accordance with the present inventive subject matter can be integrated into a wide variety of systems, e.g., heavy industrial equipment, systems (e.g., vehicles) for industrial off-road (non-automotive) environments, construction equipment, automobiles, all-terrain vehicles, etc. In some aspects, the encoders can be operated to control (and/or to assist in controlling) one or more components or sub-systems in systems in which the encoders are integrated. The present inventive subject matter also provides methods of controlling systems, including methods that comprise using one or more encoders in accordance with the present inventive subject matter.

BACKGROUND

A wide variety of encoders have been employed and/or disclosed in the past. For example, U.S. Pat. No. 7,714,272 discloses an optical absolute rotary encoder for determining the absolute values of rotational positions with high accuracy. The encoder can include an optical scale having an absolute pattern representing a code corresponding to a single absolute value using a transmitting area and/or an intercepting area. A light emitting unit can be arranged at one side with respect to the optical scale, and configured to project light on the optical scale. A light receiving unit can be arranged at the same side as the light emitting unit, and can be configured to receive light passing through the transmitting area of the optical scale. A light guide unit can be provided and configured to guide the light from the light emitting unit to the light receiving unit. The optical scale and the light emitting unit can rotate relative to each other about an axis of rotation, and the light receiving unit can be disposed on the axis of rotation.

As another example, U.S. Pat. No. 9,121,694 discloses an absolute position-measuring device that includes a first subassembly having a measuring standard on which at least one code track is disposed, and a scanning unit with which, by scanning the at least one code track in a measuring direction, position signals are able to be produced, from which an absolute digital position value is able to be generated. The position-measuring device includes a second subassembly having at least one peripheral unit adapted to perform an additional or auxiliary function of the position-measuring device.

As a further example, U.S. Pat. No. 6,100,822 discloses an optical sensing system which uses a plurality of detectors installed at various positions next to an optical panel to generate a position signal for indicating the position of the optical panel. The optical sensing system has an optical panel having a plurality of sensing areas each having a plurality of encoding holes arranged in a predetermined direction, a sensing device having a plurality of detectors for detecting movements of the optical panel corresponding to the sensing device, each of the detectors being corresponded to one of the sensing areas of the optical panel for detecting movements of the encoding holes along the predetermined direction and generating correspondent sensing signals, and a control circuit electrically connected to the sensing device for collecting the sensing signals generated by the detectors of the sensing device to form a position signal so as to indicate the optical panel's position.

BRIEF SUMMARY OF THE INVENTIVE SUBJECT MATTER

Some embodiments in accordance with the present inventive subject matter provide an encoder that has at least a first element that can be manipulated, namely, moved (rotationally and/or translationally) among a number of absolute positions and/or any number of increments relative to at least a second element.

In some aspects, the present inventive subject matter is directed to an encoder in which at least a first element is movable (e.g., translationally and/or rotationally) relative to at least a second element among a plurality of positions. In these aspects, the position in which the first element is located (relative to the second element) is determined by detecting, for each of a plurality of components, a signal that, for each such component, is dictated by the position of the first element relative to the second element. The expression "movement of a first element relative to a second element," as used herein, is equivalent to "movement of the second element relative to the first element." The expression "moving the first element," as used herein means moving (translationally and/or rotationally) the first element relative to the second element, and likewise for similar expressions (e.g., the expression "movement of the first element," as used herein, means translational and/or rotational movement of the first element relative to the second element).

The present inventors have designed encoders where at least a first element is movable relative to at least a second element, and a plurality of components are provided in which the respective signal generated by each of such components is dictated by the position of the first element relative to the second element. In such encoders, a composite signal is generated that consists of the respective signals from the plurality of components in a specific sequence (e.g., in an encoder that consists of a first component, a second component and a third component, a composite signal can be a sequence of signals consisting of the signal from the first component, followed by the signal from the second component, followed by the signal from the third component).

In accordance with a first aspect of the present inventive subject matter, the present inventors recognized that a problem can occur where composite signals are generated, each composite signal comprising a plurality of signals generated by respective components that each provide a signal in an encoder as described above (i.e., in which the position of a first element relative to the position of the second element dictates the respective signals generated by each component). This problem arises in such systems where there is at least one pair of adjacent ("adjacent" is defined below) positions of the first element relative to the second element in which two or more signals differ, i.e., upon moving the first element from a first position to a second position, the first and second positions being adjacent to one another, the respective signals output by two or more components change.

In particular, the present inventors recognized that with such an encoder, if the first element is between the first position and the second position, and if signals generated by more than one component differ between the first position and the second position, it is possible for two "stray" composite signals (i.e., composite signals that differ from the composite signal generated in the first position and from the composite signal generated in the second position) to be generated.

The first element can be between a first position and a second position (the first and second positions being adjacent) if, for example, the first element is being moved from the first position to the second position, and/or the first element is being held in an intermediate position between the first position and the second position, and/or there is a "diddling movement." "Diddling movement" can occur if the first element is moving back and forth (or is being caused to move back and forth), relative to the second element, toward the second position, but not reaching the second position, and then toward the first position, but not reaching the first position, and again toward the second position, but not reaching the second position, and again toward the first position, etc.

A representative example can be described by reference to an encoder in which there are three components that generate binary signals (i.e., each component generates either a "0" or a "1"), in which the composite signal with the first element in a first position is 0-1-0, and the composite signal with the first element in a second position (the second position adjacent to the first position) is 0-0-1. In such an encoder, if the first element is in a position in between the first position and the second position, it is possible that the composite signal could become 0-1-1 (i.e., if the most recent composite signal was the first position composite signal of 0-1-0, and the signal from the third component changes to its second position value, (i.e., 1) before the signal from the second component changes to its second position value, the composite signal would become 0-1-1); or, the composite signal could become 0-0-0 (i.e., if the most recent composite signal was the first position composite signal of 0-1-0, and the signal from the second component changes to its second position value (i.e., 0) before the signal from the third component changes to its second position value, the composite signal would become 0-0-0). In an encoder in which any of such stray composite signals correspond to valid composite signals (i.e., signals that are generated when the first element is in a position other than the first or second position), the encoder can give incorrect information regarding the position of the first element relative to the second element. For example, in an encoder in which there are three components that generate binary signals, if the composite signal in first through eighth positions are 0-1-0, 0-0-1, 1-0-1, 0-1-1, 1-0-0, 0-0-0, 1-1-0 and 1-1-1, respectively, the stray signals (namely, 0-1-1 and 0-0-0) discussed above that can be generated between the first position and the second position would incorrectly indicate that the first element is in the fourth position or the sixth position.

The term "adjacent," as used herein to refer to a spatial relationship between a first position and a second position (or between a first structure and a second structure), means that the first and second positions (or structures) are next to each other. That is, in a direction of motion (translational or rotational), no other similar "position" is between the first position and the second position (or no other similar structure is between the first structure and the second structure). For example, where a first element is movable rotationally between three positions (and only three positions), namely a first position, a second position and a third position, and rotating the first element clockwise fifteen degrees from the first position results in the first element being in the second position, and rotating the first element clockwise another fifteen degrees from the second position results in the first element being in the third position, the first and second positions are adjacent to each other (or the first and second positions are "adjacent"), and the second and third positions are adjacent to each other, but the first and third positions are not adjacent to each other. An analogous example for translational movement would be where a first element is translationally movable among three positions (and only three positions), and moving the first element one inch in a first direction from the first position results in the first element being in the second position, and moving the first element one inch in the first direction from the second position results in the first element being in the third position, the first and second positions are adjacent to each other, and the second and third positions are adjacent to each other, but the first and third positions are not adjacent to each other.

In accordance with the first aspect of the present inventive subject matter, there is provided an encoder, comprising:
 a first element,
 a second element, and
 a plurality of components,
 the first element movable among a plurality of positions relative to the second element,
 each position adjacent to at least one other position,
 each component generates a signal at each of said positions, and
 movement of the first element from any position to any adjacent position results in a change in a signal from only one of said components.

In accordance with a second aspect of the present inventive subject matter, there is provided an encoder, comprising:
 a first element,
 a second element,
 a plurality of components, and
 a multi-detector element,
 the first element movable among a plurality of positions relative to the second element,
 each position adjacent to at least one other position,
 each component generates a signal at each of said positions,
 movement of the first element from any position to any adjacent position results in a change in a signal from at least one of said components, and
 the multi-detector element comprises two or more sub-detectors that generate sub-signals, the sub-detectors spaced from each other a distance (rotational and/or translational) that is smaller than a distance between two of said positions.

The term "distance," as used herein (e.g., in the preceding two lines) can refer to angular distance (i.e., rotational distance or degree of rotation) or translational distance. The expression "translational distance," as used herein, means a distance that an object is moved in translation (in a Euclidean sense), or a distance between two locations, in one direction, or in a plurality of directions, as opposed to rotation, to get from a first location (or position) to a second location (or position). The expression "angular distance" (or "rotational distance"), as used herein, means an extent (e.g., measured in degrees) to which an object is rotated (relative to one axis or relative to two or more axes) to get from one orientation (or position) to another orientation (or position). A greater angular distance corresponds to a larger difference in rotational orientation (e.g., an angular distance of 40 degrees is greater than an angular distance of 20 degrees), except that angular distance can differ from degree of rotation in the sense that rotation of more than 360 degrees (where possible) equates to a net change in angular position equal to the angular amount by which the total degree of rotation exceeds the nearest multiple of 360 degrees that is less than the amount of rotation (e.g., clockwise rotation of 740 degrees equates to a change in angular position of 20 degrees clockwise), and angular distance can be measured clockwise or counterclockwise (i.e., especially where limitless free rotation about 360 degrees is possible, clockwise rotation of 280 degrees can be expressed a net change in angular position of 80 degrees counter-clockwise).

In accordance with a third aspect of the present inventive subject matter, there is provided a method of detecting a position of a first element relative to a second element, comprising:

moving a first element relative to a second element from a first position to a second position, the first element movable among a plurality of positions, including at least the first position and the second position, relative to the second element, each position adjacent to at least one other position, moving the first element relative to the second element from the first position to the second position causes exactly one of a plurality of components to generate a signal that differs from a signal it generated when the first element was in the first position.

In accordance with a fourth aspect of the present inventive subject matter, there is provided a method of detecting a position of a first element relative to a second element, comprising:

moving a first element relative to a second element from a first position to a second position, the first element movable among a plurality of positions, including at least the first position and the second position, relative to the second element, each position adjacent to at least one other position, moving the first element relative to the second element from the first position to the second position causes at least one of a plurality of components to generate a signal that differs from a signal it generated when the first element was in the first position, and moving the first element relative to the second element from the first position to the second position causes two or more sub-detectors to generate similar sub-signals that differ from sub-signals they generated when the first element was in the first position, the sub-detectors spaced from each other a distance (rotational and/or translational) that is smaller than a distance between the first position and the second position.

The present inventive subject matter is also directed to an encoder, comprising:

a first element, a second element, and a plurality of components, the first element movable among a plurality of positions relative to the second element.

The present inventive subject matter is also directed to a method of detecting a position of a first element relative to a second element, comprising:

moving a first element relative to a second element from a first position to a second position, the first element movable relative to the second element among a plurality of positions, including at least the first position and the second position.

The present inventive subject matter is also directed to multi-function controllers that comprise an encoder in accordance with the present inventive subject matter.

The inventive subject matter may be more fully understood with reference to the accompanying drawings and the following detailed description of the inventive subject matter.

BRIEF DESCRIPTION OF THE DRAWING FIGURES

FIG. 11 is a cross-sectional view of components in the multi-function controller depicted in FIG. 10.

Figure 15:
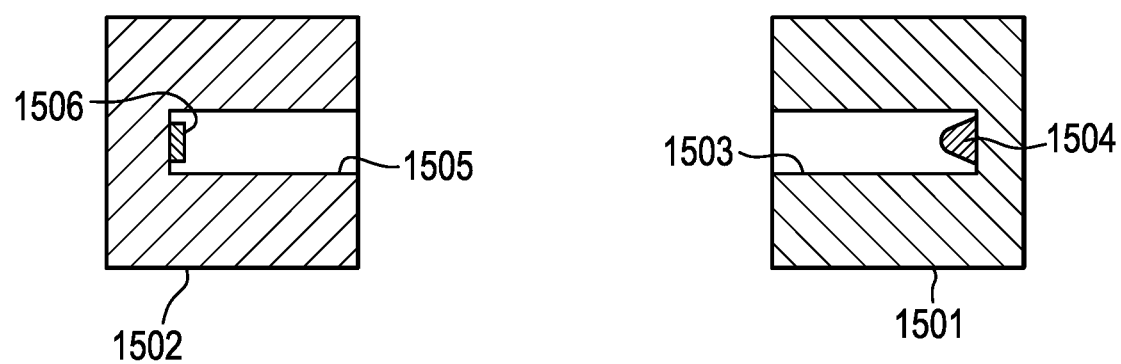

FIG. 15 schematically depicts a light emitter and a light receiver as components that can be employed in the encoders and multi-function controllers in accordance with the present inventive subject matter.

Figure 16:
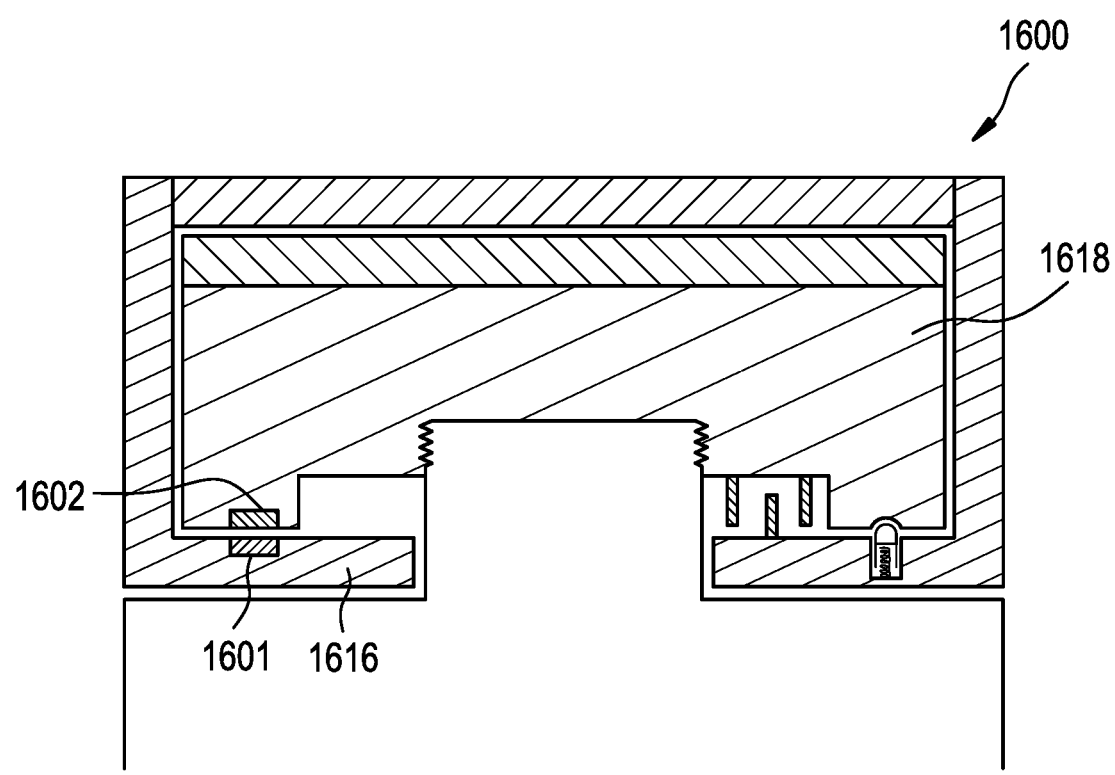

FIG. 16 schematically depicts an encoder that comprises a first element and a second element.

Figure 17:
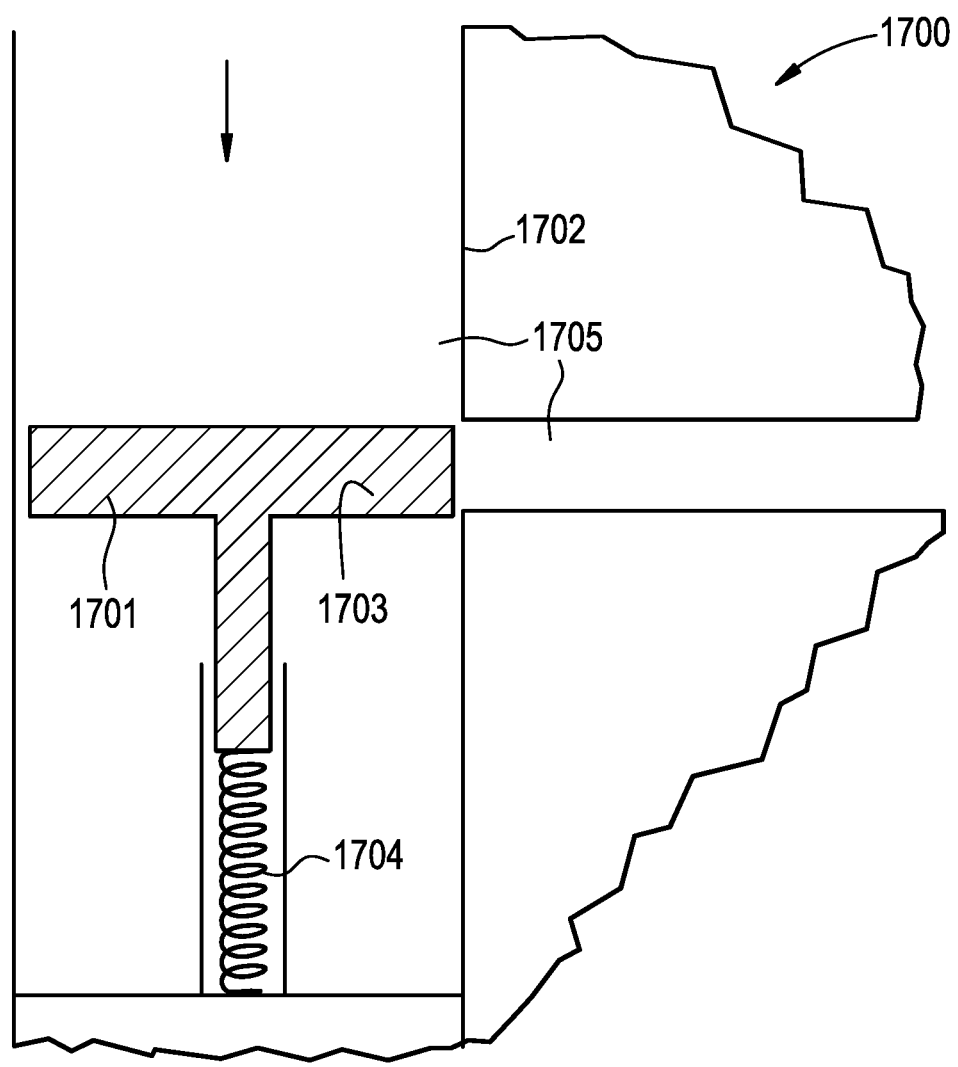

FIG. 17 schematically depicts a device that comprises a first element and a second element, and that senses flow rate.

Figure 18:
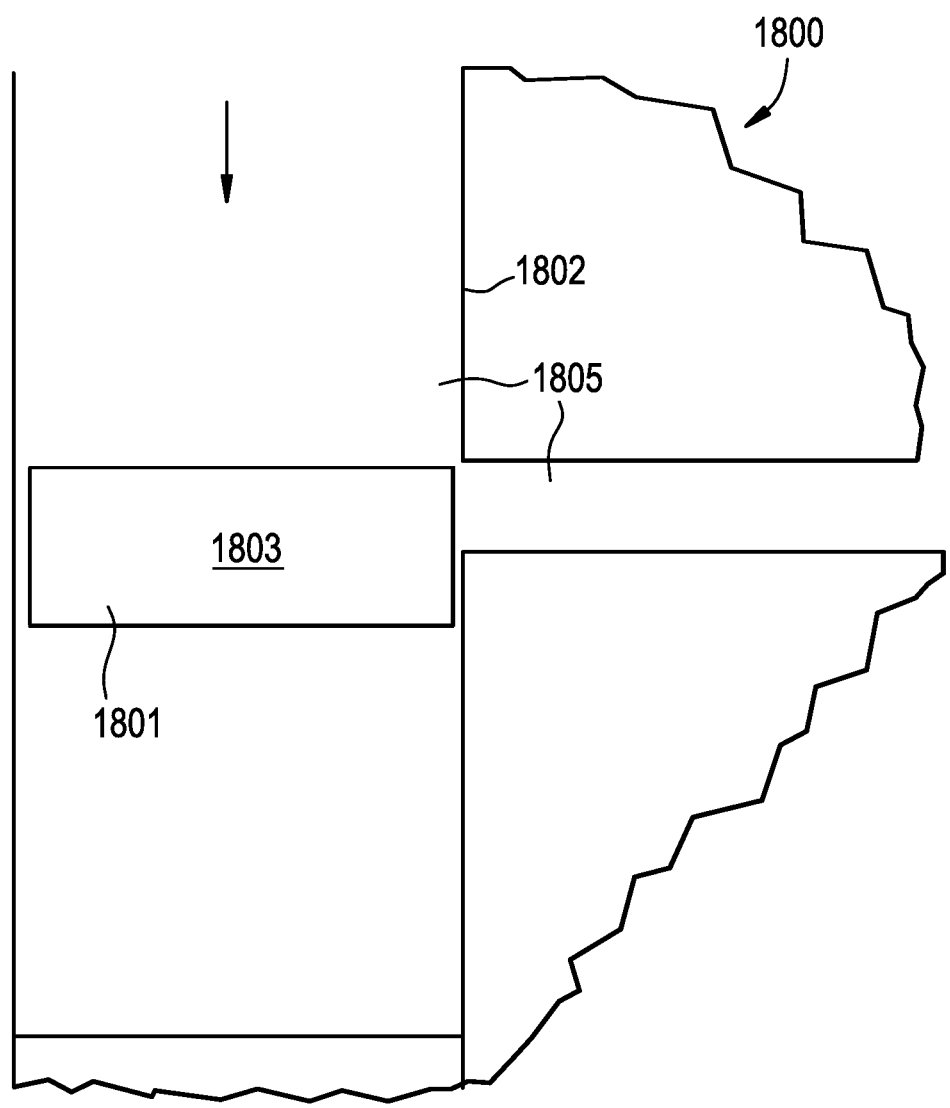

FIG. 18 schematically depicts a device that comprises a first element and a second element, and that senses flow rate.

DETAILED DESCRIPTION OF THE INVENTIVE SUBJECT MATTER

The present inventive subject matter now will be described more fully hereinafter with reference to the accompanying drawings, in which embodiments of the inventive subject matter are shown. This inventive subject matter should not be construed as being limited to the embodiments set forth herein. Rather, these embodiments are provided so that this disclosure will be thorough and complete, and will fully convey the scope of the inventive subject matter to those skilled in the art.

As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the terms "first", "second", etc. may be used herein to describe various elements, components, positions, directions, locations, signals and other items (e.g., occluders, light emitters, etc.), such elements, components, positions, directions, locations, signals and other items are not limited in any way by these terms. These terms are only used to distinguish one element, component, position, direction, location, signal or other items from another. Thus, a first element, component, position, direction, location, signal or other item could be termed a second element, component, position, direction, location, signal or other item without departing from the teachings of the present inventive subject matter.

The expression "connected," as used herein (e.g., in the expression "The light emitter/light receiver pairs 924/925 are connected to the second element 929," the expression "The occluders 926a, 926b and 926c are connected to the first element 918," the expression "occluders are connected to a first surface of a first element," the expression "light emitter/light receiver pairs are connected to a first surface of a second element," the expression "The support element 18 is rigidly connected to the housing 12," the expression "the handle element 11 is rigidly connected to the control element 16," the expression "Connected to the underside . . . of the support element 18 are three light emitter/light receiver pairs," the expression "Connected to a portion of the control element 16 . . . are a plurality of occluders 26," the expression "structures connected to the handle element 11," the expression "The first light emitter 24 and the first light receiver 25 can be connected to the control element 16," the expression "the light occluders 26 can be connected to the support element 18," the expression "The sun gear 550 is rigidly . . . connected to a housing," and the expression "the control element 516 is connected to a handle element") means that the first structure which is "connected" to a second structure can be in contact with the second structure, or can be separated from the second structure by one or more intervening structures, and that movement of the second structure will cause the first structure to move.

The term "on", e.g., as used in the expression "at least one of the components is on the second element," means that the first structure which is "on" a second structure can be in contact with the second structure, or can be separated from the second structure by one or more intervening structures (each side, or opposite sides, of which is/are in contact with the first structure, the second structure or one of the intervening structures).

The term "plurality," as used herein, means two or more, i.e., it encompasses two, three, four, five, etc. For example, the expression "plurality of positions" encompasses two positions, three positions, four positions, etc.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In accordance with the first aspect of the inventive subject matter, there are provided encoders in which upon moving the first element (relative to the second element) from any position to any other adjacent position, there is a change in the signal generated by exactly one (i.e., one and only one) of the components (i.e., one of the components that each contributes a signal to a composite signal). As a representative example, with an encoder that comprises four components, and each component has five possible signals (red, blue, yellow, green and orange), a position that has a composite signal of "red-red-green-red-blue" can be adjacent to a position that has a composite signal selected from the list below (or positions that have respective composite signals that are selected from the list below):
"blue-red-green-red-blue" (only the first signal differs);
"yellow-red-green-red-blue" (only the first signal differs);
"green red-green-red-blue" (only the first signal differs);
"orange-red-green-red-blue" (only the first signal differs);
"red-blue-green-red-blue" (only the second signal differs);
"red-yellow-green-red-blue" (only the second signal differs);
"red-green-green-red-blue" (only the second signal differs);
"red-orange-green-red-blue" (only the second signal differs);
"red-red-red-red-blue" (only the third signal differs);
"red-red-blue-red-blue" (only the third signal differs);
"red-red-yellow-red-blue" (only the third signal differs);
"red-red-orange-red-blue" (only the third signal differs);
"red-red-green-blue-blue" (only the fourth signal differs);
"red-red-green-yellow-blue" (only the fourth signal differs);
"red-red-green-green-blue" (only the fourth signal differs);
"red-red-green-orange-blue" (only the fourth signal differs);
"red-red-green-red-red" (only the fifth signal differs);
"red-red-green-red-yellow" (only the fifth signal differs);
"red-red-green-red-green" (only the fifth signal differs); and
"red-red-green-red-orange" (only the fifth signal differs).

As another representative example,
an encoder that comprises three components that each have two possible signals ("0" or "1", i.e., binary signals, to generate a composite binary signal), a position that has a composite signal of "0-1-1" can be adjacent to a position that has a composite signal selected from the list below (or positions that have respective composite signals that are selected from the list below):

1-1-1 (only the first signal differs);
0-0-1 (only the second signal differs); and
0-1-0 (only the third signal differs).

In some embodiments in accordance with the first aspect of the present inventive subject matter, there is provided an encoder that comprises a plurality of positions (i.e., a first element can be in any of a plurality of positions relative to a second element), and for two of those positions, there is only a single other position that is adjacent, and for each of the other positions, there are two other positions that are adjacent. In a representative example, an encoder has eight positions (namely, the first position, the second position, the third position, the fourth position, the fifth position, the sixth position, the seventh position and the eighth position), and:

for the first position, only the second position is adjacent;

for the second position, the first position is adjacent in a first direction (i.e., from the second position, moving the first element relative to the second element in the first direction, the adjacent position is the first position), and the third position is adjacent in a second direction (i.e., from the second position, moving the first element relative to the second element in the second direction, the adjacent position is the third position);

for the third position, the second position is adjacent in the first direction, and the fourth position is adjacent in the second direction;

for the fourth position, the third position is adjacent in the first direction, and the fifth position is adjacent in the second direction;

for the fifth position, the fourth position is adjacent in the first direction, and the sixth position is adjacent in the second direction;

for the sixth position, the fifth position is adjacent in the first direction, and the seventh position is adjacent in the second direction;

for the seventh position, the sixth position is adjacent in the first direction, and the eighth position is adjacent in the second direction;

for the eighth position, only the seventh position is adjacent (in the first direction).

In some embodiments in accordance with the first aspect of the present inventive subject matter, the encoder is a rotary encoder and in some other embodiments in accordance with the first aspect of the present inventive subject matter, the encoder is a translational encoder (and in some other embodiments, the encoder is a hybrid of a rotary encoder and a translational encoder). In a rotary encoder, a first element is rotatable (i.e., movable rotationally) relative to a second element among a plurality of positions. In a translational encoder, a first element is movable translationally relative to a second element in at least a first direction and in a direction opposite to the first direction. In some translational encoders, a first element is movable relative to a second element in at least (1) a first direction, (2) a direction opposite to the first direction, (3) a second direction, and (4) a direction opposite to the second direction, the first and second directions not being the same or opposite one another (e.g., the first element is movable relative to the second element in a forward direction (the first direction) and in a backward direction (opposite the first direction), and the first element is movable relative to the second element in a left direction (the second direction) and in a right direction (opposite the second direction). In a hybrid rotary/translational encoder, a first element is rotatable relative to a second element, and the first element is also movable relative to the second element in at least a first direction (and optionally in another direction, e.g., a direction opposite to the first direction).

The components that provide signals can be any of a wide variety of components and combinations of components, and the encoders in accordance with the present inventive subject matter are not limited to any particular components or combination of components (and the encoders in accordance with the present inventive subject matter can comprise components (or combinations of components) that are of different types).

A representative example of a combination of components that provide signals in some embodiments in accordance with the present inventive subject matter is a combination of one or more light emitters, one or more light receivers and (optionally) one or more light occluders, to provide an encoder in which light is used to generate signals that, in combination with each other (and/or in combination with other signals), indicate the position in which a first element is relative to a second element. In some of such embodiments, each of the one or more light emitters, one or more light receivers and (optionally) one or more light occluders is located on a first element or on a second element, and moving the first element relative to the second element brings about changes in the light received by one or more of the light receivers. Such changes in the light received can be one or more of the brightness of light received (e.g., the brightness is above or below a threshold brightness), the wavelength range of light received (e.g., different ranges within the visible wavelength range, and/or within other types of electromagnetic radiation, e.g., infrared light, ultraviolet light, near ultraviolet light, microwaves, etc.), duration of light received (e.g., slowly pulsing light or more rapidly pulsing light), etc.

Any other types of phenomena can be used to generate signals (with appropriate selection and positioning of components), e.g., current, voltage, fluid (gas or liquid) jets, sound waves, etc.

Encoders in accordance with the present inventive subject matter include absolute encoders (i.e., encoders in which the position of (at least) a first element relative to (at least) a second element is detected) as well as incremental encoders (i.e., encoders in which a change in the position of (at least) the first element relative to (at least) the second element is detected, that is, without detection of the position moved from or the position moved to). For example, an absolute encoder might be movable among first, second, third, fourth, fifth, sixth, seventh and eighth positions, and the encoder provides a signal that indicates which of the first through eighth positions the first element is in; on the other hand, an incremental encoder might likewise be movable among first, second, third, fourth, fifth, sixth, seventh and eighth positions, but the encoder provides a signal that indicates only whether the first element has moved in a first direction or in a second direction (e.g., clockwise or counter-clockwise, left or right, forward or backward, up or down, etc.). In some embodiments of an incremental encoder in which a first element moves rotationally relative to a second element, the first element is capable of unlimited rotation relative to the second element (e.g., the first element can be rotated, clockwise or clockwise, from a start position all the way around to again reach the start position and beyond); in some embodiments of an absolute encoder in which a first element moves rotationally relative to a second element, the first element is capable of rotation relative to the second element among only a number of positions spanning only a portion of 360 degrees (e.g., the first element can be rotated only among first through eighth positions, each spaced by 15 degrees, and the first element is blocked from rotating beyond the first position or beyond the eighth position, for example:

the first position is at a first location, the second position is at 15 degrees clockwise from the first location, the third position is at 30 degrees clockwise from the first location, the fourth position is at 45 degrees clockwise from the first location, the fifth position is at 60 degrees clockwise from the first location, the sixth position is at 75 degrees clockwise from the first location, the seventh position is at 90 degrees clockwise from the first location, and the eighth position is at 105 degrees clockwise from the first location, and the first element is restricted to not go clockwise beyond 105 degrees clockwise from the first location, and to not go counter-clockwise beyond the first location, i.e., it is restricted to between 0 degrees and 105 degrees clockwise relative to the first location—in other words, it cannot go anywhere between 105 degrees and 360 degrees clockwise from the first location).

Persons of skill in the art are familiar with many ways to structure first and second elements, in which the first element is movable relative to the second element in any desired way (e.g., the first element is rotatable relative to the second element, the first element is movable translationally relative to the second element, and combinations of such movements), and any of such structures are encompassed by the present inventive subject matter. For example, representative ways to structure first and second elements to be movable in the manner described herein are disclosed in U.S. patent application Ser. No. 15/183,233, filed Jun. 15, 2016(now U.S. Patent Publication No. 2016/0370821 A1), the entirety of which is incorporated herein by reference for its disclosure of ways to structure first and second elements with the first element movable relative to the second element in any desired way, as well as for its disclosure of all other subject matter, including subject matter relating to multi-function controllers and encoders.

In some embodiments in which light is used to generate signals that, in combination with each other and/or with other signals, indicate the position in which a first element is relative to a second element, one or more light emitters and a plurality of light receivers are on the first element, and a plurality of occluders are on the second element (or vice-versa, i.e., one or more light emitters and a plurality of light receivers are on the second element, and a plurality of occluders are on the first element). In some of such embodiments, the first element is rotationally movable: [1] in a clockwise direction from a first position to a last position in sequence, or any portion of such sequence, and [2] in a counter-clockwise direction from the last position to the first position in reverse sequence, or any portion of such reverse sequence. In others of such embodiments, the first element is rotationally movable: [1] continuously (i.e., it can be freely rotated about its axis) in a clockwise direction among all positions in sequence, or any portion of such sequence, and [2] continuously (i.e., it can be freely rotated about its axis) in a counter-clockwise direction among all positions in reverse sequence, or any portion of such sequence. In others of such embodiments, the first element is translationally movable: [1] in a first direction from a first position to a last position in sequence, or any portion of such sequence, and [2] in a direction opposite the first direction from the last position to the first position in reverse sequence, or any portion of such reverse sequence. As noted above, any combination of rotational movement capability and translational movement capability can be provided. In each of such embodiments, in accordance with the first aspect of the present inventive subject matter:

[a] a signal is generated by each light receiver at each position;

[b] a composite signal (comprising each of the respective signals generated by each light receiver) is generated at each position;

[c] upon the first element moving from any position to any adjacent position, only one signal in the composite signal changes.

Embodiments in accordance with the present inventive subject matter are described herein in detail in order to provide exact features of representative embodiments that are within the overall scope of the present inventive subject matter. The present inventive subject matter should not be understood to be limited to such detail.

Embodiments in accordance with the present inventive subject matter are also described with reference to cross-sectional illustrations that are schematic illustrations of idealized embodiments of the present inventive subject matter. As such, variations from the shapes of the illustrations as a result, for example, of manufacturing techniques and/or tolerances, are to be expected. Embodiments of the present inventive subject matter should not be construed as being limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

Figure 1:
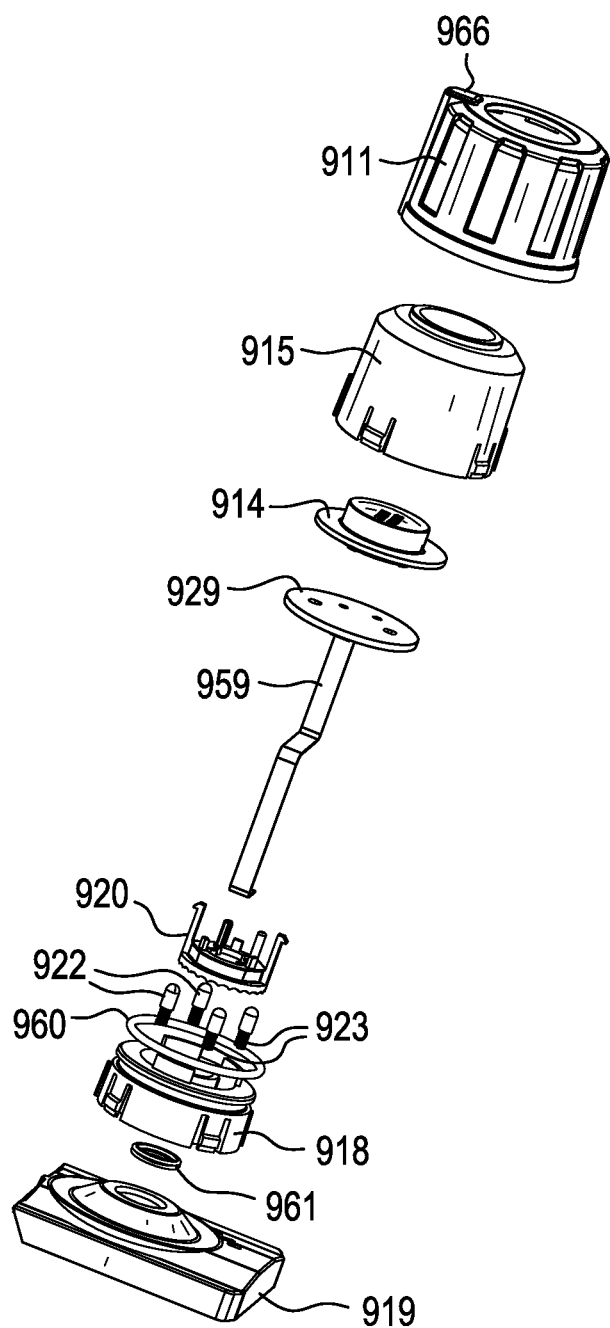
FIG. 1 is an exploded view of components of an encoder in accordance with the present inventive subject matter.

FIG. 1 is an exploded view of components of an encoder in accordance with the present inventive subject matter. The components can be shaped in a wide variety of different ways, e.g., such that an encoder can comprise only a first element, a second element and a plurality of components (e.g., an encoder can comprise a first element 918, a second element 929, components such as at least one light emitter and a plurality of light receivers). The multi-function controller depicted in FIG. 1 comprises a handle element 911 (in the form of a cap), an icon cap 914 (which comprises an icon and a graphic light pipe for illuminating the icon), a lens 915, a first element (in the form of a support element) 918, a detent structure 920 (with multiple detents on its underside), detent engaging elements 922, springs 923, a second element (in the form of a printed circuit board) 929 (with sensors), and a flex cable 959. Light emitters and light receivers are on the underside of the printed circuit board 929, and occluders are provided on the first element 918. The flex cable 959 provides electrical connections to allow at least for power to be delivered to the light emitters and light receivers, for power to be delivered to the light pipe that illuminates the icon cap, and for signals generated by the light receivers to be conveyed.

Figure 2:
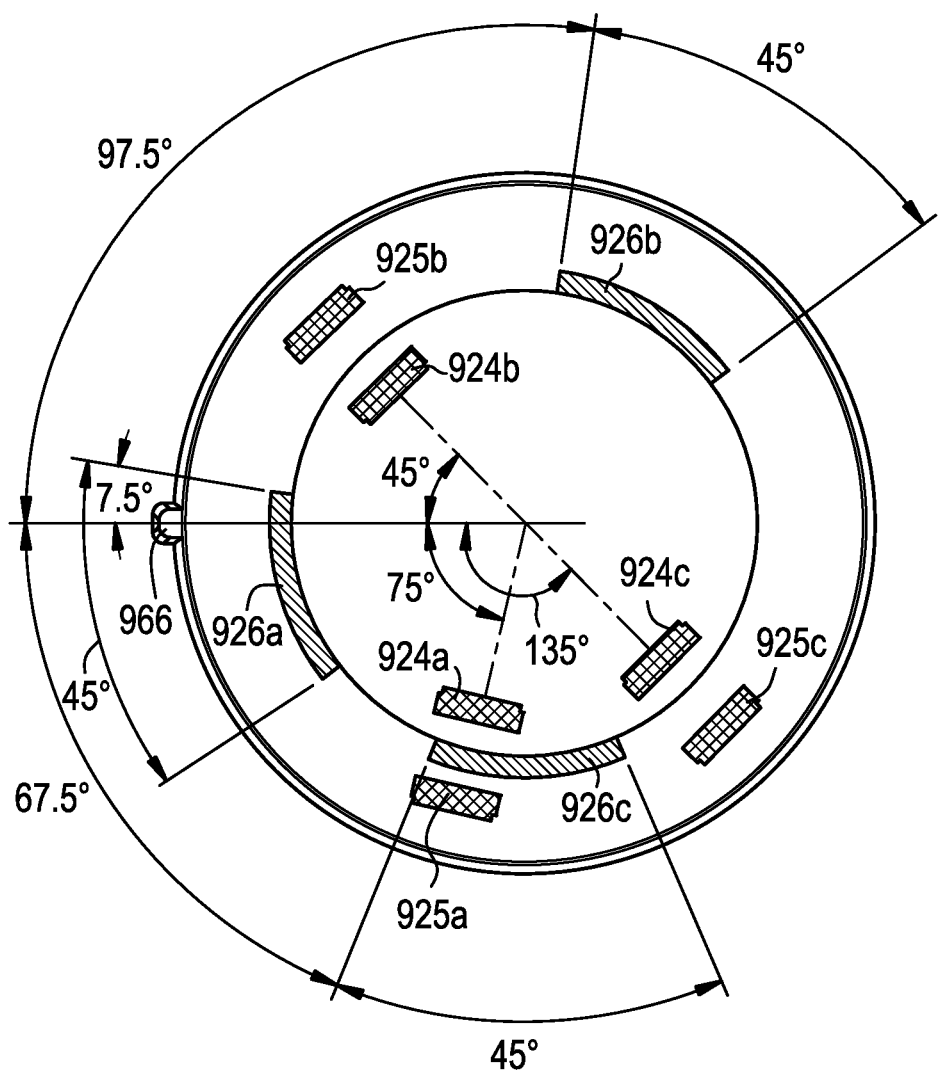
FIG. 2 is a cross-sectional, non-exploded, view of the device depicted in FIG. 1.

FIG. 2 is a cross-sectional, non-exploded, view of the device depicted in FIG. 1, with the section taken in a plane perpendicular to an axis of the first element 918 and the second element 929, and the plane between the first element 918 and the second element 929. FIG. 2 shows three light emitter/light receiver pairs, a first light emitter/first light receiver pair 924a/925a, a second light emitter/second light receiver pair 924b/925b and a third light emitter/third light receiver pair 924c/925c (i.e., each light emitter/light receiver pair comprises a light emitter 924 and a light receiver 925). The light emitter/light receiver pairs 924/925 are connected to the second element 929 (the underside of the second element 929 in the orientation depicted in FIG. 1). FIG. 2 also shows three occluders, a first occluder 926a, a second occluder 926b and a third occluder 926c. The occluders 926a, 926b and 926c are connected to the first element 918 (the top side of the first element 918 in the orientation depicted in FIG. 1).

FIG. 2 is angularly to scale, i.e., the angular relationships depicted in FIG. 2 are present in the components (i.e., the angular positioning of the occluders 926, the portions of a circumference that the occluders extend, the angular positioning of the midpoints of the light emitters 924 and the angular positioning of the midpoints of the light receivers 925 are present in the components; the portions of a circumference that the light emitters 924 extend and the portions of a circumference that the light receivers 925 extend are not limited to the scale depicted, radial thicknesses of the respective components are not limited to the scale depicted, and the overall sizes of all components are not limited to the scale depicted) included in the embodiment depicted in FIGS. 1 and 2.

FIGS. 1 and 2 also show a protrusion 966 on the handle element 911 that provides a visual indication (e.g., for a user to see), as well as a tactile indication (e.g., that a user can feel) of the rotational position of the first element 918 relative to the second element 929.

Figure 3:
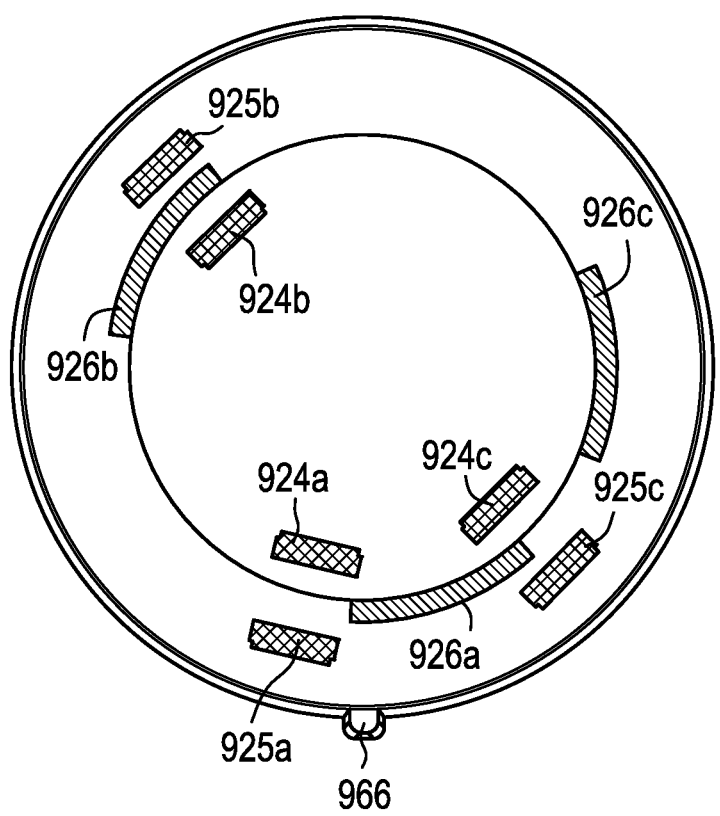
FIG. 3 is a cross-sectional, non-exploded, view of the device depicted in FIG. 1, with the handle element 911 in a first position.
Figure 4:
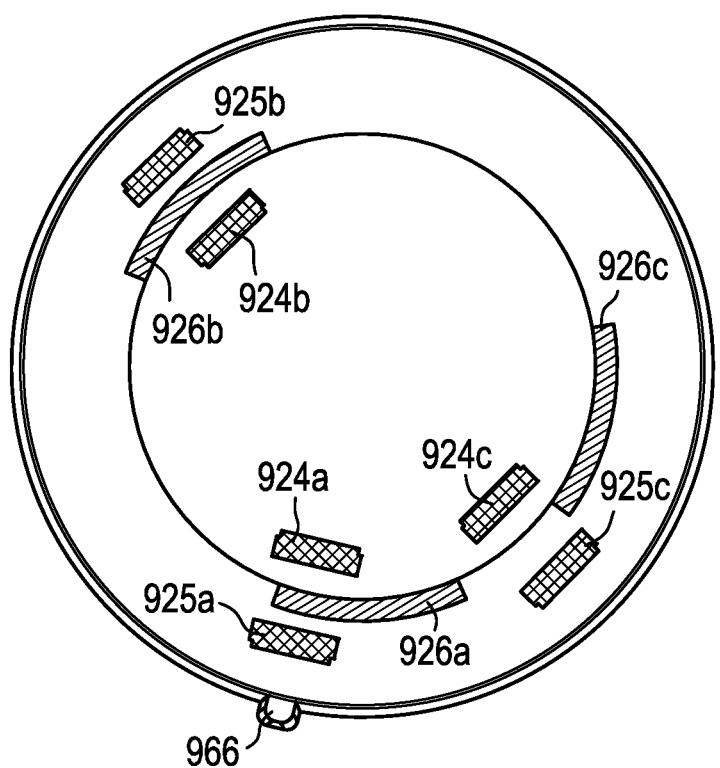
FIG. 4 is a cross-sectional, non-exploded, view of the device depicted in FIG. 1, with the handle element 911 in a second position.
Figure 5:
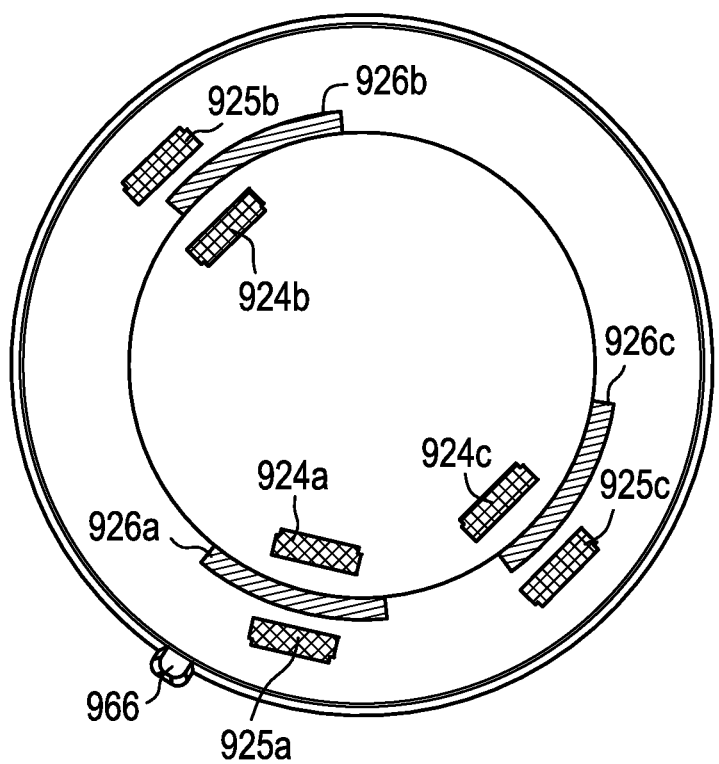
FIG. 5 is a cross-sectional, non-exploded, view of the device depicted in FIG. 1, with the handle element 911 in a third position.
Figure 6:
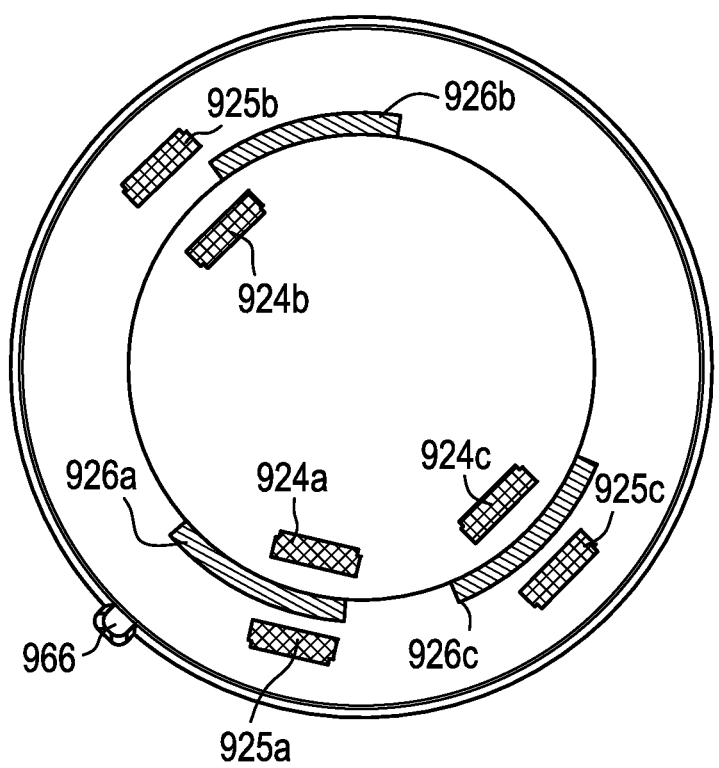
FIG. 6 is a cross-sectional, non-exploded, view of the device depicted in FIG. 1, with the handle element 911 in a fourth position.
Figure 7:
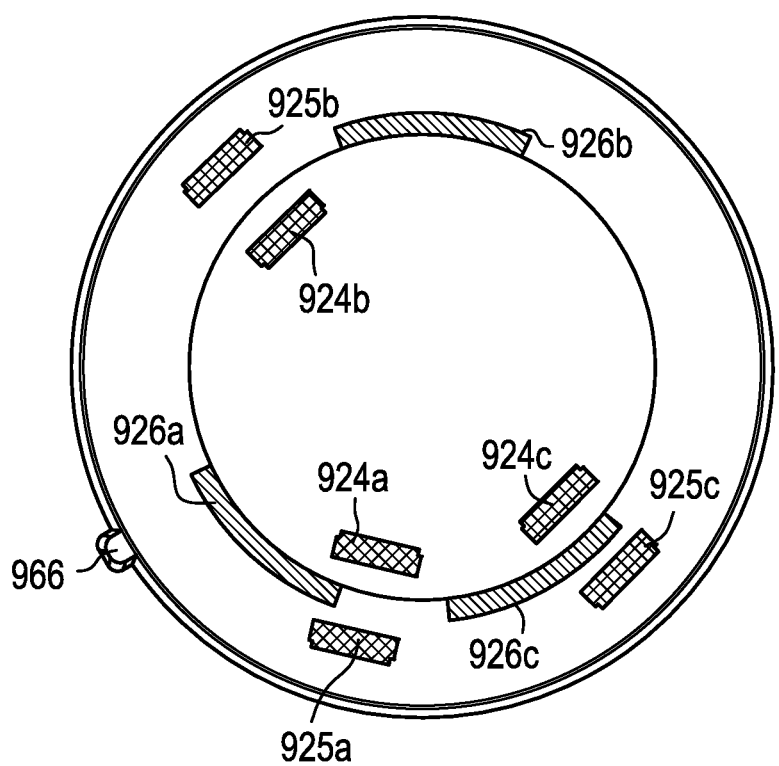
FIG. 7 is a cross-sectional, non-exploded, view of the device depicted in FIG. 1, with the handle element 911 in a fifth position.
Figure 8:
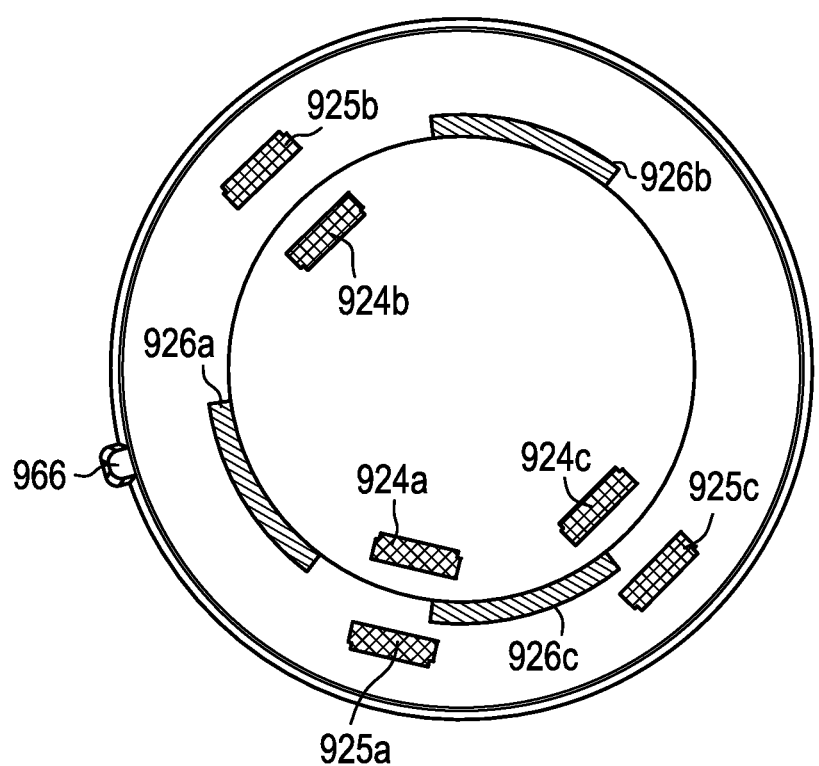
FIG. 8 is a cross-sectional, non-exploded, view of the device depicted in FIG. 1, with the handle element 911 in a sixth position.
Figure 9:
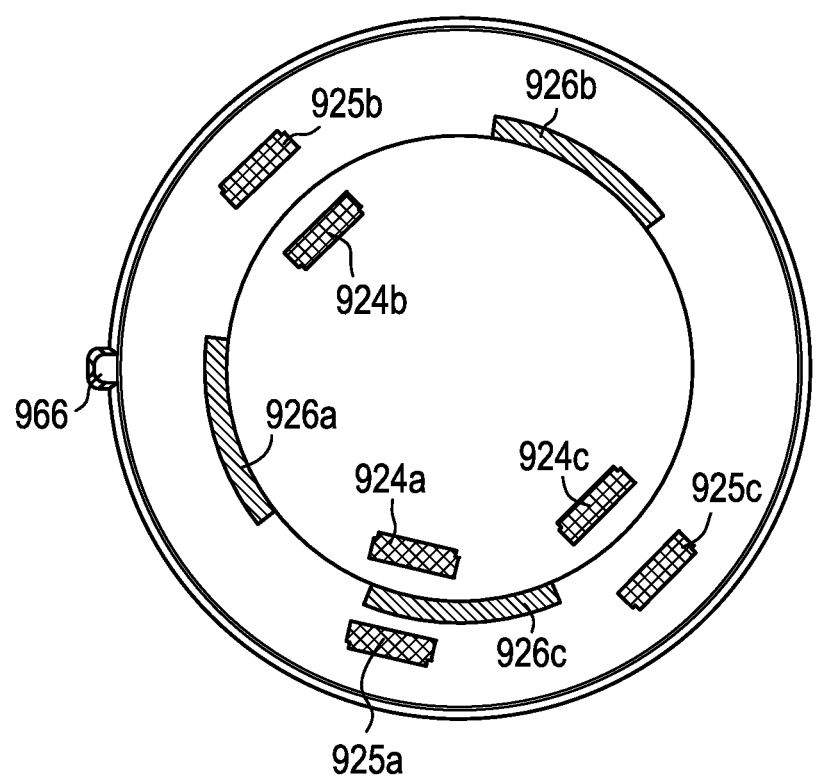
FIG. 9 is a cross-sectional, non-exploded, view of the device depicted in FIG. 1, with the handle element 911 in a seventh position.

The first element 918 is engaged with the handle element 911, such that rotating the handle element 911 (i.e., about its axis) causes the first element 918 to rotate relative to the second element 929. The handle element 911 is rotatable among seven positions, including:

a first position, depicted in FIG. 3, in which:
the first light receiver 925a is not blocked from the first light emitter 924a, and so the first light receiver receives bright light (a digital "1" signal),
the second light receiver 925b is blocked from the second light emitter 924b by the second occluder 926b, and so the second light receiver does not receive bright light (a digital "0" signal),
the third light receiver 925c is not blocked from the third light emitter 924c, and so the third light receiver receives bright light (a digital "1" signal),
a second position, depicted in FIG. 4, in which:
the first light receiver 925a is blocked from the first light emitter 924a by the first occluder 926a, and so the first light receiver does not receive bright light (a digital "0" signal),
the second light receiver 925b is blocked from the second light emitter 924b by the second occluder 926b, and so the second light receiver does not receive bright light (a digital "0" signal),
the third light receiver 925c is not blocked from the third light emitter 924c, and so the third light receiver receives bright light (a digital "1" signal),
a third position, depicted in FIG. 5, in which:
the first light receiver 925a is blocked from the first light emitter 924a by the first occluder 926a, and so the first light receiver does not receive bright light (a digital "0" signal),
the second light receiver 925b is blocked from the second light emitter 924b by the second occluder 926b, and so the second light receiver does not receive bright light (a digital "0" signal),
the third light receiver 925c is blocked from the first light emitter 924c by the third occluder 926c, and so the third light receiver does not receive bright light (a digital "0" signal),
a fourth position, depicted in FIG. 6, in which:
the first light receiver 925a is blocked from the first light emitter 924a by the first occluder 926a, and so the first light receiver does not receive bright light (a digital "0" signal),
the second light receiver 925b is not blocked from the first light emitter 924b, and so the second light receiver receives bright light (a digital "1" signal),
the third light receiver 925c is blocked from the first light emitter 924c by the third occluder 926c, and so the third light receiver does not receive bright light (a digital "0" signal),
a fifth position, depicted in FIG. 7, in which:
the first light receiver 925a is not blocked from the first light emitter 924a, and so the first light receiver receives bright light (a digital "1" signal),
the second light receiver 925b is not blocked from the first light emitter 924b, and so the second light receiver receives bright light (a digital "1" signal),
the third light receiver 925c is blocked from the first light emitter 924c by the third occluder 926c, and so the third light receiver does not receive bright light (a digital "0" signal),
a sixth position, depicted in FIG. 8, in which:
the first light receiver 925a is not blocked from the first light emitter 924a, and so the first light receiver receives bright light (a digital "1" signal),
the second light receiver 925b is not blocked from the first light emitter 924b, and so the second light receiver receives bright light (a digital "1" signal),
the third light receiver 925c is not blocked from the third light emitter 924c, and so the third light receiver receives bright light (a digital "1" signal), and
a seventh position, depicted in FIG. 9, in which:
the first light receiver 925a is blocked from the first light emitter 924a by the third occluder 926c, and so the first light receiver does not receive bright light (a digital "0" signal),
the second light receiver 925b is not blocked from the first light emitter 924b, and so the second light receiver receives bright light (a digital "1" signal),
the third light receiver 925c is not blocked from the third light emitter 924c, and so the third light receiver receives bright light (a digital "1" signal).

In FIG. 2, the handle element 911 is in the seventh position. Accordingly:
in the first position, the composite signal is 1-0-1;
in the second position, the composite signal is 0-0-1;
in the third position, the composite signal is 0-0-0;
in the fourth position, the composite signal is 0-1-0;
in the fifth position, the composite signal is 1-1-0;
in the sixth position, the composite signal is 1-1-1; and
in the seventh position, the composite signal is 0-1-1.

Accordingly, in every change of position from any position to any adjacent position, only one signal changes (i.e., among the signals from the three light receivers, that is, among the signals in the composite signal, only one signal changes upon moving the first element from any particular position (i.e., any of the seven positions) to any position that is adjacent to such particular position).

As shown in FIGS. 3 and 4, the first position is adjacent to the second position (and the second position is adjacent to the first position), and starting from the first position, rotating the first element 15 degrees clockwise brings the first element to the second position (and starting from the second position, rotating the first element 15 degrees counter-clockwise brings the first element to the first position).

As shown in FIGS. 4 and 5, the second position is adjacent to the third position (and the third position is adjacent to the second position), and starting from the second position, rotating the first element 15 degrees clockwise brings the first element to the third position (and starting from the third position, rotating the first element 15 degrees counter-clockwise brings the first element to the second position).

As shown in FIGS. 5 and 6, the third position is adjacent to the fourth position (and the fourth position is adjacent to the third position), and starting from the third position, rotating the first element 15 degrees clockwise brings the first element to the fourth position (and starting from the fourth position, rotating the first element 15 degrees counter-clockwise brings the first element to the third position).

As shown in FIGS. 6 and 7, the fourth position is adjacent to the fifth position (and the fifth position is adjacent to the fourth position), and starting from the fourth position, rotating the first element 15 degrees clockwise brings the first element to the fifth position (and starting from the fifth position, rotating the first element 15 degrees counter-clockwise brings the first element to the fourth position).

As shown in FIGS. 7 and 8, the fifth position is adjacent to the sixth position (and the sixth position is adjacent to the fifth position), and starting from the fifth position, rotating the first element 15 degrees clockwise brings the first element to the sixth position (and starting from the sixth position, rotating the first element 15 degrees counter-clockwise brings the first element to the fifth position).

As shown in FIGS. 8 and 9, the sixth position is adjacent to the seventh position (and the seventh position is adjacent to the sixth position), and starting from the sixth position, rotating the first element 15 degrees clockwise brings the first element to the seventh position (and starting from the seventh position, rotating the first element 15 degrees counter-clockwise brings the first element to the sixth position).

Figure 10:
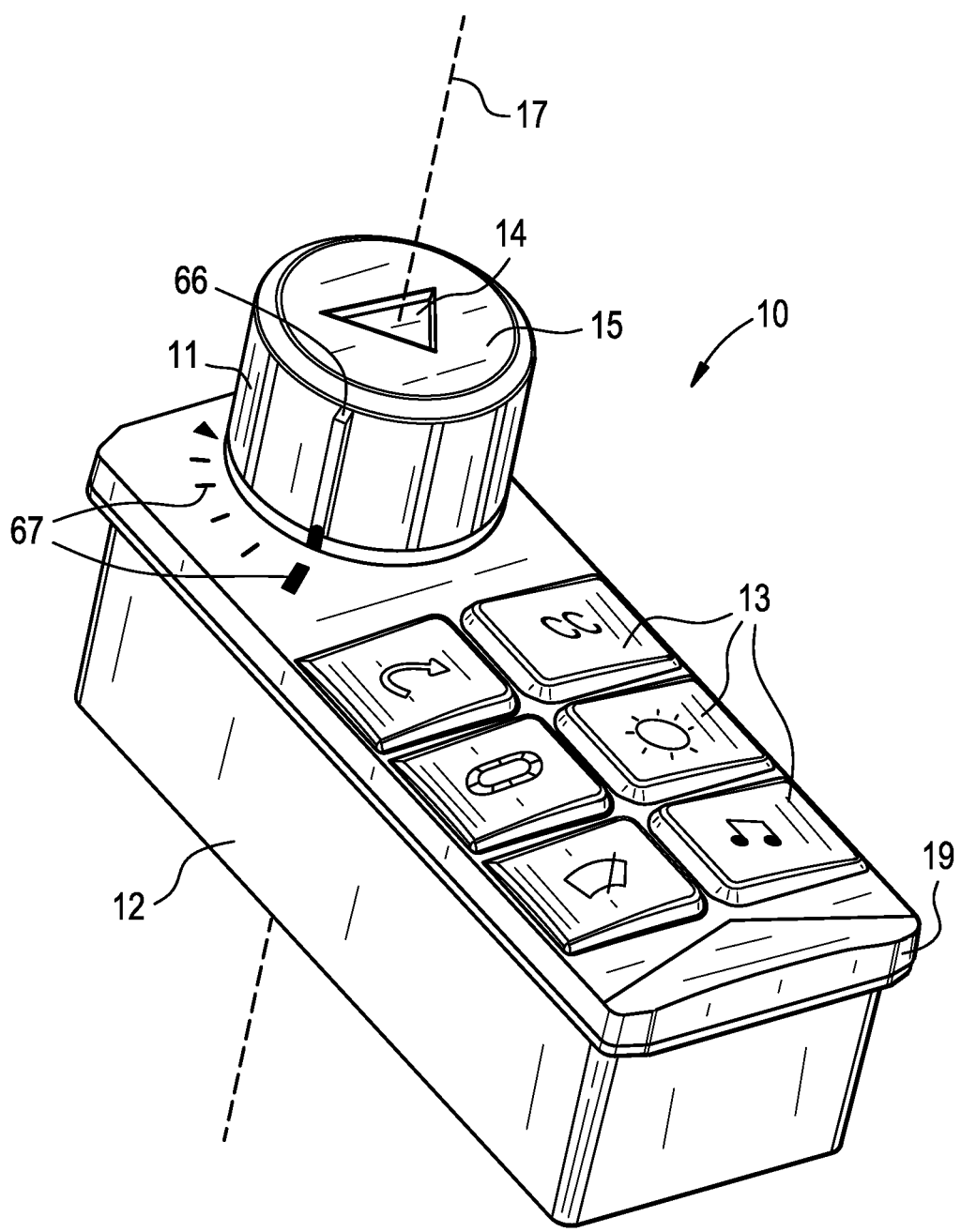
FIG. 10 is a perspective view showing an embodiment of a multi-function controller 10 that includes an encoder.

In some embodiments in accordance with the first aspect of the present inventive subject matter, markings can be provided on the first element (and/or on a component that is connected to the first element) and/or on the second element (and/or on a component that is connected to the second element) to provide a visual indication as to the position in which the first element is relative to the second element. As an example, FIG. 10 is a perspective view showing an embodiment of a multi-controller 10 that includes an encoder (e.g., an encoder as depicted in FIG. 1), in which markings 67 are provided on the housing 12 (to which the second element, e.g., the second element 929 in the encoder depicted in FIG. 1, is connected) such that a protrusion 66 on the handle element (to which the first element, e.g., the first element 918 in the encoder depicted in FIG. 1, is connected) is aligned with a respective marking depending on the position in which the first element is relative to the second element.

In some embodiments in accordance with the first aspect of the present inventive subject matter, structure can be provided to prevent the first element from rotating beyond desired positions. For example, in the embodiment depicted in FIG. 1, there can be provided a stop element that prevents the first element from being rotated clockwise beyond the seventh position or from being rotated counter-clockwise beyond the first position.

As noted above, in some embodiments, a first element is rotationally movable: [1] in a clockwise direction from a first position to a last position in sequence, or any portion of such sequence, and [2] in a counter-clockwise direction from the last position to the first position in reverse sequence, or any portion of such reverse sequence. The embodiment depicted in FIGS. 1-9 is such an embodiment, in that [1] the first element 918 can be rotated in a clockwise direction from the first position to the seventh position (the last position) in sequence (i.e., from the first position to the second position, then from the second position to the third position, etc.) or any portion of such sequence (e.g., from the second position to the third position), and [2] the first element 918 can be rotated in a counter-clockwise direction from the seventh position to the first position in reverse sequence (i.e., from the seventh position to the sixth position, then from the sixth position to the fifth position, etc.), or any portion of such reverse sequence (e.g., from the fifth position to the fourth position), and any sequence of rotational movement can be carried out. For example, the first element can remain in any position for any desired length of time, and from any position, the first element can be moved, clockwise or counter-clockwise, to any other position (and can remain there for any desired length of time, including only instantaneously), and from that position, the first element can be moved, clockwise or counter-clockwise, to any other position (and remain there for any desired length of time), except that from the first position, the first element cannot be rotated counter-clockwise and from the seventh position, the first element cannot be rotated clockwise.

Other embodiments in accordance with the present inventive subject matter include embodiments that are similar to the embodiment depicted in FIGS. 1-9, except that [1] the first element can be rotated to more positions or fewer positions, and/or [2] the respective rotational positions are angularly spaced differently from the angular spacing in the embodiment depicted in FIGS. 1-9 (e.g., the positions are spaced more than 15 degrees or less than 15 degrees and/or different spacings are of differing quantities of degrees), and/or [3] different quantities of light emitters, light receivers and/or occluders are provided (e.g., a single light emitter can be provided substantially in the center of the second element 929, and the light emitter emits light in all angular directions), respective light emitters, light receivers and/or occluders can be positioned in other arrangements and/or different components can be respectively provided on the first element and the second element, etc., and/or [4] the first element is rotationally movable continuously (i.e., it can be freely rotated about its axis) in clockwise and counter-clockwise directions, i.e., the first element is not stopped from rotating beyond any rotational positions, e.g., it can be rotated to any and all rotational positions, and it can be rotated clockwise (or counter-clockwise) 360 degrees numerous times in succession.

As noted above, in other embodiments, alternatively (or additionally) a first element is translationally movable relative to a second element: [1] in a first direction from a first position to a last position in sequence, or any portion of such sequence, and [2] in a direction opposite the first direction (or that differs from opposite, to the extent that rotation has occurred) from the last position to the first position in reverse sequence, or any portion of such reverse sequence.

As is evident from the discussion above, in the embodiment depicted in FIGS. 1-9, a change in a signal is brought about by a change in the brightness of light received (e.g., the brightness is above or below a threshold brightness). The present inventive subject matter also provides embodiments in which a change in a signal is brought about by a change in the wavelength range of visible light received (and/or a change from no light or light below a threshold brightness to light within a particular wavelength range (or such changes in the context of electromagnetic radiation other than visible light in an analogous way), duration of light received (e.g., slowly pulsing light or more rapidly pulsing light), etc., or changes in other phenomena or parameters, e.g., fluid flow (gas or liquid), sound waves, vibrations, current, voltage, etc.).

In some embodiments in accordance with the present inventive subject matter, there is provided an encoder that comprises a "narrowly-gapped detectors component", i.e., a component (a "multi-detector element") that comprises two or more sub-detectors (i.e., sub-components that generate sub-signals) that are spaced from each other a small amount ("narrowly-gapped") in a direction of movement (i.e., they are spaced an angular distance less than the angular distance between rotationally adjacent positions, or they are spaced a translational distance less than the translational distance between translationally adjacent positions), and for some positions, each sub-detector in a narrowly-gapped detectors component changes its sub-signal upon moving a first element relative to a second element from that position to an adjacent position. (As noted above, the term "distance" can refer to translational distance or rotational distance.) In particular, in first and second capabilities (discussed below) in such embodiments (i.e., with two or more sub-detectors spaced from each other a small amount), a direction of movement can be detected (first capability), and/or an intention (e.g., on the part of a user) to change from one position to another position can be more reliably detected (second capability), and/or signal change as a result of diddling with minimal movement (or no movement) can be avoided (second capability)). Such capabilities make it possible to provide a greater number of absolute positions (i.e., distinct positions in an absolute encoder) and/or to provide an encoder that performs its desired functions even where there are constraints on the locations that components can be positioned (e.g., where there are constraints on where light emitters and/or light receivers can be positioned) that would otherwise prevent an encoder from being able to provide the desired number of absolute positions (and/or would prevent the encoder from being an absolute encoder, and/or would result in lower accuracy, and/or would result in excessive diddling, etc.).

As a representative example of a way to provide a "multi-detector element" (a "narrowly-gapped detectors component"), two (or more) such sub-detectors can be provided in a single component that has two (or more) openings (e.g., slits) through which light can enter and be selectively detected (i.e., the component can detect light being received through the first opening independently from detecting light being received through the second opening), such that the component comprises sub-detectors that (in combination) provide sub-signals of (in the case of two sub-detectors):
first opening [yes], second opening [yes];
first opening [yes], second opening [no];
first opening [no], second opening [yes]; or
first opening [no], second opening [no], or,
alternatively, two (or more) separate sub-components can be provided (at a suitable angular spacing) such that each sub-component functions as a sub-detector that (in combination) provide readings of:
first sub-component [yes], second sub-component [yes];
first sub-component [yes], second sub-component [no];
first sub-component [no], second sub-component [yes]; or
first sub-component [no], second sub-component [no].

In a first capability in which two or more sub-detectors are spaced from each other a small amount in a direction of movement (i.e., an angular distance less than the angular distance between rotationally adjacent positions, or a translational distance less than the translational distance between translationally adjacent positions), and each sub-detector changes signal upon moving a first element relative to a second element from at least one position to an adjacent position, the two or more sub-detectors can be used to detect a direction of movement of the first element relative to the second element (e.g., movement from a position to an adjacent position) by detecting the sequence in which the respective signals from the two (or more) sub-detectors change. For example, if one or more occluders are connected to a first surface of a first element and a plurality of light emitter/light receiver pairs are connected to a first surface of a second element, and the first surface of the first element faces the first surface of the second element such that rotating the first element relative to the second element causes the occluder(s) to move to some positions where it (or they) blocks light from passing between a light emitter and a light receiver of a light emitter/receiver pair (e.g., in a device as depicted in FIGS. 1-9), and in such a device, a first light emitter/light receiver pair and a second light emitter/light receiver pair are rotationally adjacent to one another, with the second light emitter/light receiver pair spaced five degrees clockwise from the first light emitter/light receiver pair (i.e., clockwise from a perspective above the device, with the device oriented such that the first surface of the first element is facing upward and the first surface of the second element is facing downward) from the first light emitter/light receiver pair, and the occluder (or each occluder) extends 45 degrees, and the first light emitter/light receiver pair changes its signal (from a first signal to a second signal, e.g., from receiving light to not receiving light) slightly prior to the second light emitter/light receiver pair changing its signal (likewise from the first signal to the second signal), it is apparent that the first element is rotating in a clockwise direction (i.e., clockwise from the same perspective, i.e., above the device). In such a device, the first light emitter/light receiver pair acts as a first sub-detector, the second light emitter/light receiver pair is a second sub-detector, and the first and second sub-detectors are respective sub-components of a narrowly-gapped detectors component. In such a device, or in any other device in accordance with the present inventive subject matter, one or more narrowly-gapped detectors components can be used as one or more of the detectors (e.g., in place of one or more of the light receivers 925) used to detect position absolutely, and/or can be provided as a separate component for providing any of the first and/or second capabilities described above.

By having the capability of determining the direction of movement, the number of positions that can be detected absolutely (i.e., in an absolute encoder) can be increased, because it is possible to differentiate between two positions with identical composite signals based on the prior composite signal and the direction in which the first element moved.

For example, if a composite signal changes from 0-0-0 to 0-0-1, and there are first and second positions in which the signal is 0-0-1, and:

for the first position, moving from an adjacent position in which the composite signal is 0-0-0 to the first position requires that the first element be rotated in a clockwise direction, and for the second position, moving from an adjacent position in which the composite signal is 0-0-0 to the second position requires that the first element be rotated in a counter-clockwise direction, a composite signal of 0-0-1 after a counter-clockwise movement of the first element indicates that the first element is in the second position (and not the first position).

In a second capability in which two or more detectors are narrowly-gapped, the two or more sub-detectors are employed in a voting scheme in which a change from one position to an adjacent position is not recognized until both sub-detectors (or all sub-detectors) report a change in sub-signal. For example, in an arrangement as described above in connection with detecting direction of movement (i.e., one or more occluders are connected to a first surface of a first element, a plurality of light emitter/light receiver pairs are connected to a first surface of a second element, the first surface of the first element faces the first surface of the second element such that rotating the first element relative to the second element causes the occluder(s) to move to some positions where it (or they) blocks light from passing between a light emitter and a light receiver of a light emitter/receiver pair, a first light emitter/light receiver pair and a second light emitter/light receiver pair are rotationally adjacent to one another, with the second light emitter/light receiver pair spaced five degrees clockwise from the first light emitter/light receiver pair, and the occluder (or each occluder) extends 45 degrees), the composite signal from the device can include a signal that changes only upon both the first and second light emitter/light receiver pairs reporting a change in sub-signal (e.g., only upon both changing from "not receiving light" to "receiving light" or upon both changing from "receiving light" to "not receiving light").

By providing a device in which a signal from a narrowly-gapped detector component changes only upon a similar change in two or more "sub-signals" reported from sub-detectors spaced from each other a small amount (narrowly-gapped) in a direction of movement (rotational or translational), an intention (e.g., on the part of a user) to change from one position to another position can be more reliably detected, because moving the first element far enough to change a sub-signal in only one of the narrowly-gapped sub-detectors is not enough to bring about a change in the signal reported from the component (i.e., the narrowly-gapped detectors component).

In addition, by providing a device in which a signal from a narrowly-gapped detector component changes only upon a similar change in two or more "sub-signals" reported from sub-detectors spaced from each other a small amount (narrowly-gapped) in a direction of movement, diddling with minimal movement can be avoided (second capability), because minimal movement is not sufficient to change both sub-signals in the component (i.e., the narrowly-gapped detectors component). In other words, if two sub-detectors are provided in a narrowly-gapped detectors component and such sub-detectors are spaced five degrees from each other, the first element would have to be rotated back and forth ("rotational swing") at least approximately five degrees in order to diddle.

In accordance with a second aspect of the present inventive subject matter, there is provided a second way to address the problem (discussed above) that the present inventors recognized (namely, the problem that where a composite signal comprises signals that are generated by a plurality of components, and there is at least one pair of adjacent positions of a first element relative to a second element in which two or more signals differ, it is possible for stray composite signals to be generated). This second way to address the above-described problem can be employed by itself or in combination with the first way to address the problem (i.e., the first aspect of the present inventive subject matter).

In accordance with the second aspect of the present inventive subject matter, there is provided an encoder that comprises a "narrowly-gapped detectors component", i.e., (as discussed above) a component (a "multi-detector element") that comprises two or more sub-detectors (sub-components that generate sub-signals) that are spaced from each other a small amount ("narrowly-gapped") in a direction of movement (i.e., they are spaced an angular distance less than the angular distance between rotationally adjacent positions, or they are spaced a translational distance less than the translational distance between translationally adjacent positions), and for some positions, each sub-detector in a narrowly-gapped detectors component changes its sub-signal upon moving a first element relative to a second element from that position to an adjacent position.

As discussed above, an encoder that comprises a narrowly-gapped detectors component makes it possible to detect the direction of movement of a first element relative to a second element. Such information (i.e., the direction of movement) in combination with the prior composite signal can be used to determine, upon moving the first element from a first position toward an adjacent position (i.e., a position that is adjacent to the first position), the identity of the position toward which the first element is being moved, thereby providing the capability of eliminating at least some stray composite signals from among the possible composite signals that can be detected.

For example, in a rotary encoder that includes eight rotational positions, arranged such that starting from the first position and rotating the first element clockwise, the first element sequentially moves to the second position, then the third position, then the fourth position, then the fifth position, then the sixth position, then the seventh position and then the eighth position, and the respective positions have the following composite signals:

first position—0-1-0;
second position—1-1-0;
third position—1-1-1;
fourth position—1-0-0;
fifth position—0-0-0;
sixth position—0-1-1;
seventh position—0-0-1;
eighth position—1-0-1, moving from the third position to the fourth position involves changes in two of the signals included in the composite signal, and moving from the fifth position to the sixth position likewise involve changes in two signals included in the composite signal.

If the problem recognized by the present inventors were not addressed, moving the first element from the third position to the fourth position could result in stray composite signals of 1-0-1 (eighth position) and 1-1-0 (second position), one of which is adjacent (namely, the second position) to the third position. In accordance with the second aspect of the present inventive subject matter, knowledge from a narrowly-spaced detectors component that the first element is moving in a clockwise direction from the third position provides information by which the stray composite signals (including the second position) can be recognized as being invalid.

In encoders in accordance with the present inventive subject matter in which light emitters are employed, any suitable light emitter can be employed, and the selection of appropriate or desired light emitters can be guided by the application for which the encoder is to be used, and/or the accuracy desired.

Similarly, in encoders in accordance with the present inventive subject matter in which light receivers are employed, any suitable light receiver can be employed, and the selection of appropriate or desired light receivers can be guided by the application for which the encoder is to be used, and/or the accuracy desired.

In encoders in accordance with the present inventive subject matter in which light emitters and light receivers are employed, the light emitters and light receivers can be selected to have a desired degree of compatibility. For example, there exist light emitters that have a large window (i.e., light exits through an opening on a front face of the light emitter) and light receivers that have a smaller window (i.e., light passes through an opening on a front face of the light receiver, the opening in the light receiver smaller than the opening in the light emitter) that can suitably be paired together.

In the encoders in accordance with the present inventive subject matter, any component that provides a signal has a normal range of accuracy, and persons of skill in the art are readily able to provide components that have a range of accuracy that comports with the range of accuracy needed for the particular application to which the encoder is to be put, and/or for a range of accuracy that the encoder is to be expected to provide. For example, in embodiments of rotary encoders in which light emitters and light receivers are employed and the light emitters are placed near the center of the rotary region and each light receiver is spaced from its respective light emitter (i.e., each light emitter is paired with a light receiver), in general:

the closer the light emitters are to the center of the rotary region, the less accurate the light emitter/light receiver pairs are;

the closer the light receivers are to the periphery of the rotary region, the less accurate the light emitter/light receiver pairs are;

the wider the spread of light from the light emitters is, the less accurate the light emitter/light receiver pairs are; and the lower the precision of alignment between each light emitter and its respective light receiver, the less accurate the light emitter/light receiver pairs are, etc.

In other words, if higher accuracy is needed or desired, each light emitter can be positioned closer to its respective light receiver, light emitters that have a more concentrated beam of light emission can be employed, light emitters in which light exiting has to pass through a tunnel to exit can be employed (and the tunnel can be lengthened, and/or relatively non-reflective and/or light-absorbing), light receivers in which light being received has to pass through a tunnel to reach the light receiver can be employed (and the tunnel can be lengthened, and/or relatively non-reflective and/or light-absorbing), the light emitters and light receivers can be inside a housing that allows little or no ambient light from outside to enter the space in which the light emitters and light receivers are located, etc. As a representative example, FIG. 15 schematically depicts a light emitter 1501 and a light receiver 1502. The light emitter 1501 comprises a light emitter tunnel 1503 and an LED 1504. The light receiver 1502 comprises a light receiver tunnel 1505 and a light sensor 1506. At least some light emitted from the LED 1504 passes through the light emitter tunnel 1503, then through the light receiver tunnel 1505 and is then received by the light sensor 1506.

In some embodiments in accordance with the present inventive subject matter, there are provided encoders that comprise a plurality of components that each generate a signal, and that in combination generate a unique composite signal at each of a plurality of positions of a first element relative to a second element (whereby the encoder is an absolute encoder) as well as one or more narrowly-gapped detectors components, and the encoder does not recognize a change in position of the first element until there are changes in both sub-signals (or each sub-signal) from a corresponding narrowly-gapped detectors component (or at least one of a plurality of narrowly-gapped detectors components, or any number of narrowly-gapped detectors components). In some of such embodiments, the encoder is a rotary encoder, the plurality of components that each generate a signal are on a first ring, and the one or more narrowly-gapped detectors components are on a second ring (and in some embodiments, a center of the first ring and a center of the second ring both coincide with the axis about which the first element rotates relative to the second element).

In some embodiments in accordance with the present inventive subject matter, when diddling occurs (i.e., composite signals are generated that represent two adjacent positions are alternating, e.g., a first position, then a second position (adjacent to the first position) and then back to the first position), the encoder can have a duration of time for which a changed signal has to remain before the changed signal is recognized, e.g., a duration of one second, i.e., if the encoder is detected to be in the first position (i.e., a first element is in a first position relative to a second element), and then a composite signal representative of the second position is received for one-half second, and then a composite signal representative of the first position is again received, the encoder would be detected to still be in the first position, and then if the composite signal representative of the second position is again detected, upon one second elapsing with the composite signal still being that of the second position, the encoder would change to be detected to be in the second position.

In some embodiments in accordance with the present inventive subject matter, a device can further comprise one or more electrical contacts, e.g., one or more electrical contacts can be provided on a first element and one or more electrical contacts can be provided on a second element, whereby moving the first element relative to the second element can bring respective electrical contacts into electrical contact with each other, such that when such electrical contacts are in electrical contact, current flows from one or more contact to one or more other contact, thereby providing an electrical signal indicating that such contacts are in electrical contact, and/or that the first electrical element is in a particular position (or in one of a number of positions), and/or to activate one or more components (e.g., an LED indicator light), etc. As a representative example, FIG. 16 schematically depicts an encoder 1600 that comprises a first element 1618 and a second element 1616, the second element 1616 rotatable relative to the first element 1618, the first element 1618 comprising a first element contact 1602, the second element 1616 comprising a second element contact 1601, and moving the first element 1618 relative to the second element 1616 can bring the first element contact 1602 into electrical contact with the second element contact 1601 (and further moving the first element 1618 relative to the second element 1616 can take the first element contact 1602 out of electrical contact with the second element contact 1601).

In a third aspect of the present inventive subject matter, there are provided devices that control an amount of gas or liquid passing through the device (i.e., the device can be a valve). Such devices comprise a first member that is movable relative to a second member among a plurality of positions, in which a minimum cross-sectional area for flow through the device differs among the different positions, and in which components are provided by which the position in which the first element is can be detected.

In a fourth aspect of the present inventive subject matter, there are provided devices that sense a flow rate (or quantity) of gas or liquid passing through the device. Such devices comprise a first member that moves relative to a second member in response to the quantity of gas or liquid passing through the device, and the device comprises components that can detect the position in which the first member is (and thereby detect the flow rate through the device). In such devices, the first member can move in response to the quantity of gas or liquid passing through the device by having a piston that is contacted by the gas or liquid and pushed (e.g., within a cylinder) relative to a biasing force (e.g., a spring), or the first member can be in a corkscrew or fan blade shape that is biased toward a rest position, or any other suitable arrangement. Representative embodiments of devices that sense a flow rate are schematically depicted in FIGS. 17 and 18. FIG. 17 schematically depicts a device 1700 that comprises a first element 1701 and a second element 1702. The second member 1702 comprises a conduit 1705 and the first member comprises a piston 1703. Upon flow of gas and/or liquid in the direction of the arrow depicted in FIG. 17, the piston 1703 is pushed by the gas and/or liquid against the biasing force of a spring 1704, and translational movement of the piston 1703 relative to the conduit 1705 is detected in a manner within the scope described herein for detecting movement of a first element relative to a second element. FIG. 18 schematically depicts a device 1800 that comprises a first element 1801 and a second element 1802. The second member 1802 comprises a conduit 1805 and the first member comprises any structure that is movable (against a biasing force) in response to the force of a gas and/or fluid flowing through the conduit 1805 (e.g., the first element 1801 comprises a corkscrew 1803, a fan blade 1803, etc.). Upon flow of gas and/or liquid in the direction of the arrow depicted in FIG. 18, the structure 1803 is pushed (translationally and/or rotationally) by the force gas and/or liquid against the biasing force, and the translational and/or rotational movement of the structure 1803 relative to the conduit 1805 is detected in a manner within the scope described herein for detecting movement of a first element relative to a second element.

An embodiment of a multi-function controller that comprises an encoder in accordance with the present inventive subject matter is depicted in FIG. 10. FIG. 10 depicts a multi-function controller 10 that comprises a handle element 11 (in the form of a control knob), a housing 12, a first flexible mat 19 that comprises six pushbuttons 13 (each optionally having indicia that indicate a function or functions accessed by pressing each respective pushbutton 13) and an icon cap 14 which is viewable through a transparent lens 15 in an inner region of the handle element 11.

Figure 12A:
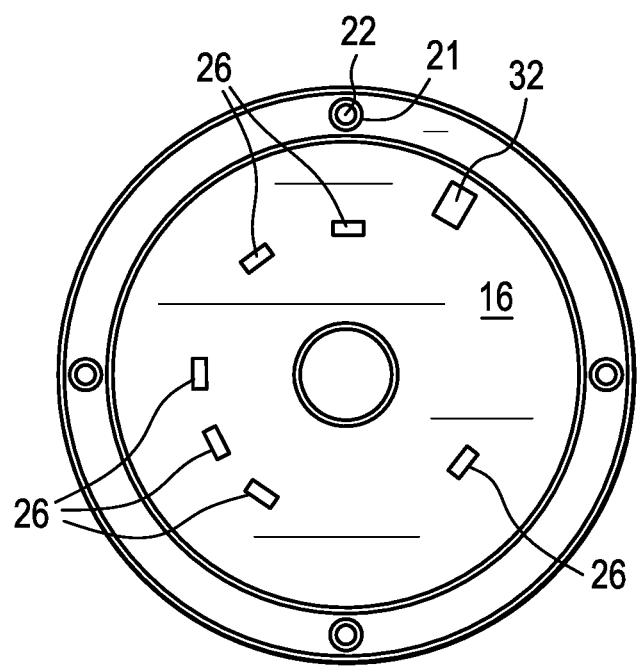
FIGS. 12A and 12B are plan views of components in the multi-function controller depicted in FIG. 10.
Figure 12B:
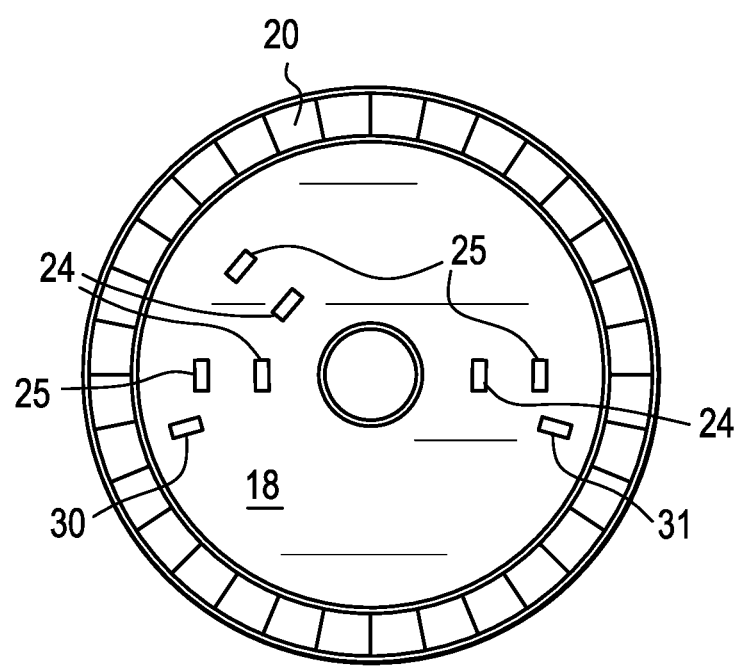

FIGS. 11, 12A and 12B schematically depict a control element 16, and components (1) that allow for the control element 16 to be caused to rotate incrementally relative to an imaginary first axis 17 (and relative to the housing 12) by moving the handle element 11 relative to the first axis, (2) that allow for the rotational position of the control element 16 to be detected, (3) that allow for the control element 16 to be moved axially along the first axis 17, and (4) that allow for movement of the control element 16 along the first axis 17 to be detected.

FIG. 11 shows the control element 16, the first axis 17, a support element 18 and the icon cap 14. The support element 18 is rigidly connected to the housing 12, and the handle element 11 is rigidly connected to the control element 16. The control element 16 is free to rotate relative to the first axis 17 and relative to the support element 18 to any rotational position between a first rotational limit and a second rotational limit. FIG. 12A depicts the top (in the orientation depicted in FIG. 11) surface of the control element 16, and FIG. 12B depicts the bottom (in the orientation depicted in FIG. 11) surface of the support element 18. FIG. 12B shows a first stop element 30 (on the support element 18) and a second stop element 31 (also on the support element 18) and FIG. 12A shows a stop element-engaging structure 32 (on the control element 16). As is evident from FIGS. 12A and 12B, the first rotational limit is reached when the stop element-engaging structure 32 comes into contact with the first stop element 30, and the second rotational limit is reached when the stop element-engaging structure 32 comes into contact with the second stop element 31.

The underside (in the orientation depicted in FIG. 11) of the support element 18 has a plurality of detents 20, and the surface of the control element 16 that faces the detents 20 has a plurality of bores 21, in each of which is positioned a detent engaging element 22 which is biased upward (in the orientation depicted in FIG. 11) by a spring 23 (see FIG. 11), whereby each detent engaging element 22 extends into a respective detent 20 if the control element 16 is rotated to one of its incremental rotational positions. Accordingly, a user who is rotating the handle element 11 can readily feel when the control element 16 reaches or is in one of its incremental rotational positions, and such user can readily feel each incremental rotational movement (e.g., the user can readily rotate the handle element 11 to rotate the control element 16 by a single rotational movement or by any desired number of rotational movements).

Connected to the underside (in the orientation depicted in FIG. 11) of the support element 18 are three light emitter/light receiver pairs, each light emitter/light receiver pair comprising a light emitter 24 and a light receiver 25. Connected to a portion of the control element 16 that faces the underside (in the orientation depicted in FIG. 11) of the support element 18 are a plurality of occluders 26 (only one of which is visible in FIG. 11). In the rotational position of the support element 18 depicted in FIG. 11, the occluder 26 visible in FIG. 11 is between the first light emitter 24 and the first light receiver 25, whereby most or all of the light emitted by the first light emitter 24 is not received by the first light receiver 25, such that in the rotational position of the control element 16 depicted in FIG. 2, a "0" signal (in a binary sense) is received for the first light emitter/receiver pair 24/25. If the control element 16 were rotated clockwise one rotational position (i.e., so that each detent engaging element 22 is moved to the adjacent clockwise detent, i.e., the detent engaging element 22 is moved from being received in a first detent 20 to another detent that is an immediate neighbor to the first detent 20 but one position away in the clockwise direction), the occluder 26 visible in FIG. 11 would be moved to a location where it is not between the first light emitter 24 and the first light receiver 25, and no other structure would block light emitted by the first light emitter 24 from reaching the first light receiver 25, whereby a "1" signal (in a binary sense) would be received for the first light emitter/receiver pair 24/25. If the support element 18 were rotated clockwise one additional rotational position, a different occluder 26 (FIG. 12A shows that there are a plurality of occluders 26 on the control element 16) would be between the first light emitter 24 and the first light receiver 25, and the signal from the first light emitter/receiver pair 24/25 would switch back to a "0" signal.

In each rotational position, each light emitter/light receiver pair 24/25 produces a "0" signal (if an occluder is between the light emitter and the light receiver in that light emitter/light receiver pair) or a "1" signal (if no occluder is between the light emitter and the light receiver in that light emitter/light receiver pair). By arranging the occluders relative to the three light emitter/light receiver pairs, up to eight different signal combinations can be generated for different rotational positions, i.e., first the first, second and third light emitter/light receiver pairs, combinations of respective signals of 0-0-0, 0-0-1, 0-1-0, 0-1-1, 1-0-0, 1-0-1, 1-1-0 and 1-1-1 can be generated at respective different rotational positions.

As noted above, rotation of the handle element 11 can create any desired signal. Each rotational position of the handle element 11 can create a unique signal. Components like those depicted in FIG. 11 can be incorporated into a device in which the handle element 11 can be pushed down (and/or pulled up) to generate signals, and/or the handle element 11 can be tilted to generate signals.

In one specific representative integration of the multi-function controller 10 into a system, the multi-function controller 10 is operated by pressing a pushbutton 13, thereby accessing a particular menu, then the handle element 11 is rotated to a specific rotational position, and then the handle element 11 is pressed downward, thereby indicating that the user is selecting a function dictated by the rotational position of the handle element 11 within the menu previously accessed by pressing the specific pushbutton 13.

Various modifications can be made to the multi-function controller 10 depicted in FIGS. 11, 12A and 12B. Any number of detents 20 and detent engaging elements 22 can be provided, the detents 20 can be provided in a surface of the control element 16 (instead of in the support element 18)(and the detent engaging elements 22 can be provided in a surface of the support element 18 instead of in the control element 16), or any other suitable components or combination of components can be included for providing the user a feel for the rotational positions of the handle element 11. The first light emitter 24 and the first light receiver 25 can be connected to the control element 16 (instead of the support element 18) and the light occluders 26 can be connected to the support element 18 (instead of the control element 16). One or more light emitter(s) in a multi-function controller can emit light within a specific wavelength range (which may differ from a wavelength range in which one or more other light emitter(s) emits light, and/or one or more light receivers is sensitive to light within only a particular wavelength range, and/or different light receivers are sensitive only to light in different wavelength ranges. A multi-function controller could be made that does not include any occluders, and one or more light emitters and/or one or more light receivers is on one of the control element 16 or the support element 18, and one or more light emitters and/or light receivers is on the other of the control element 16 or the support element 18 such that rotation of the control element 16 relative to the support element 18 can be detected by the brightness and/or wavelength of light received by the light receiver or by each respective light receiver. The stop elements 30 and 31 and/or the stop element-engaging structure 32 can be eliminated so that the control element 16 can rotate relative to the support element 18 without any limit, and/or rotational positions can be provided at any desired rotational positions. Any desired number of light emitters, light receivers and occluders can be provided, and they can be positioned in any desired way to generate signals indicative of any rotational position or positions of the control element 16 relative to the support element 18. Any combination of such modifications can be made to the multi-function controller 10 depicted in FIGS. 11, 12A and 12B, or to any other controller in accordance with the present inventive subject matter.

In the embodiment depicted in FIGS. 11, 12A and 12B, in every change of position from any position to any adjacent position, only one signal changes, i.e., among the signals from the three light receivers (that is, among the signals in the composite signal), only one signal changes upon changing the first element from any position to any adjacent position.

In the embodiment depicted in FIGS. 11, 12A and 12B, rotational movement of the control element 16 is detected as an absolute characteristic (i.e., the rotational position of the control element 16 is detected), but this embodiment (or any other embodiment) could instead be one in which the rotational movement of the control element is detected incrementally (i.e., rotational movement of the control element 16, and the direction of such movement, is detected), and any of the components described herein (e.g., in the description herein of a second embodiment in accordance with the present inventive subject matter) for providing incremental rotational detection can be employed.

In the embodiment depicted in FIGS. 11, 12A and 12B, or in any other embodiment, including or not including any combination of the modifications described above, the control element 16 can also be tiltable, to allow for more unique signals to be generated, i.e., to provide more actions or combinations of actions that can be detected, e.g., a specific pushbutton pressed, control element rotated to a specific rotational position (or rotated a specific number of positions in one direction or the other), control element tilted in a specific direction, control element pressed down (or pulled up) (e.g., to enter the selection identified by such combination of actions). In one embodiment, for example, a control element 16 can be tilted (from an upright orientation) in any of four directions (from the perspective of a user looking down on the control element, i.e., along an axis of the control element, tilt down, tilt up, tilt right, tilt left). Alternatively, any different desired number of tilt directions can be provided, and/or the tilt directions can be in any desired directions.

Figure 13:
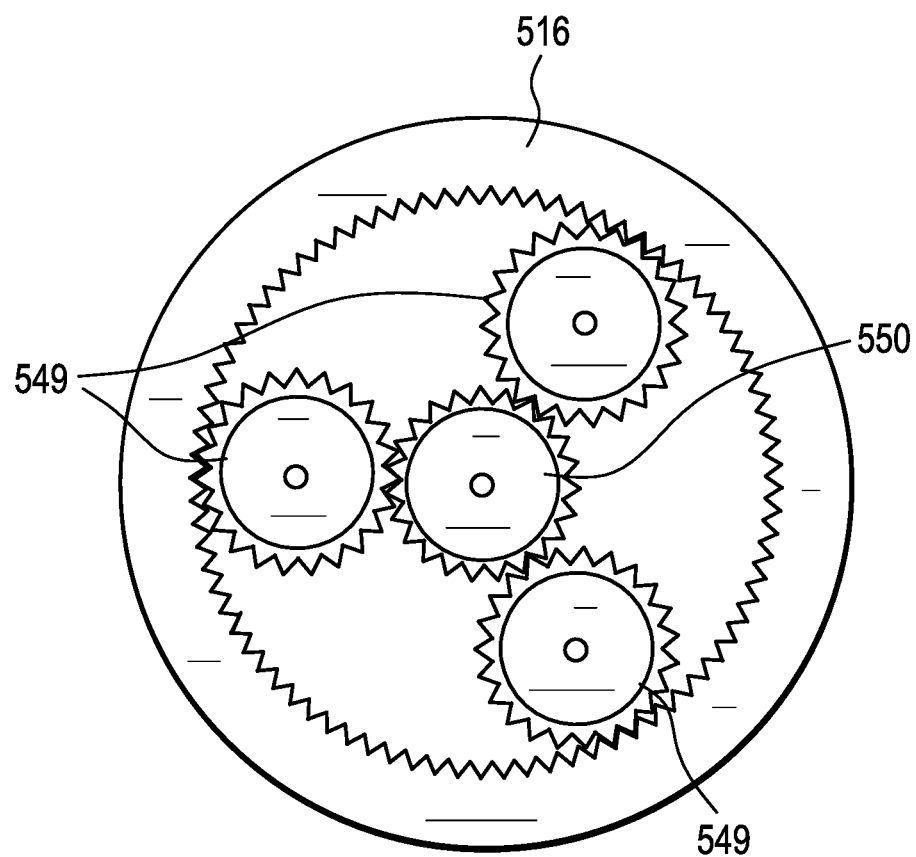
FIG. 13 is a schematic view of components that can be included in a planetary gear arrangement in an embodiment in accordance with the present inventive subject matter.

In any encoder in accordance with the present inventive subject matter, rotation of a first element (e.g., a control element) relative to a second element (e.g., a housing) (and optionally relative to other components, such as an icon cap) can be provided in the manner depicted in the embodiment shown in FIGS. 11, 12A and 12B. Alternatively, in any encoder in accordance with the present inventive subject matter, such rotation of a control element can be provided in any other suitable manner, e.g., with components as depicted in FIG. 13. FIG. 13 schematically depicts a cross-sectional view of a control element 516, three planet gears 549 and a sun gear 550. The sun gear 550 is rigidly (i.e., non-rotatably) connected to a housing, and the control element 516 is connected to a handle element. The control element 516 has teeth that engage with the teeth on the planet gears 549, and the teeth on the planet gears 549 also engage with teeth on the sun gear 550, thereby providing a planetary gear arrangement (i.e., including the control element 516 functioning as the ring gear, the planet gears 549 and the sun gear 550), such that upon rotating the handle element relative to the housing, the control element 516 will rotate relative to the housing, the planet gears 549 will rotate (relative to their respective axes) relative to the housing, and the sun gear 550 will remain stationary (relative to the housing).

The various components in the encoders in accordance with the present inventive subject matter can be made of a variety of materials (or combinations of materials), as desired. For example, different components can be made of plastics, metals, alloys, etc. For example, persons of skill in the art are familiar with materials that can be used to make elements that provide structural rigidity (where necessary), flexibility, toughness, conductivity, etc. With the description in the present specification, persons of skill in the art can readily select suitable materials for the various components (in light of the functions to be provided by such components), and encoders with components made of all such materials (and/or combinations of materials) are included within the scope of the present inventive subject matter.

Figure 14:
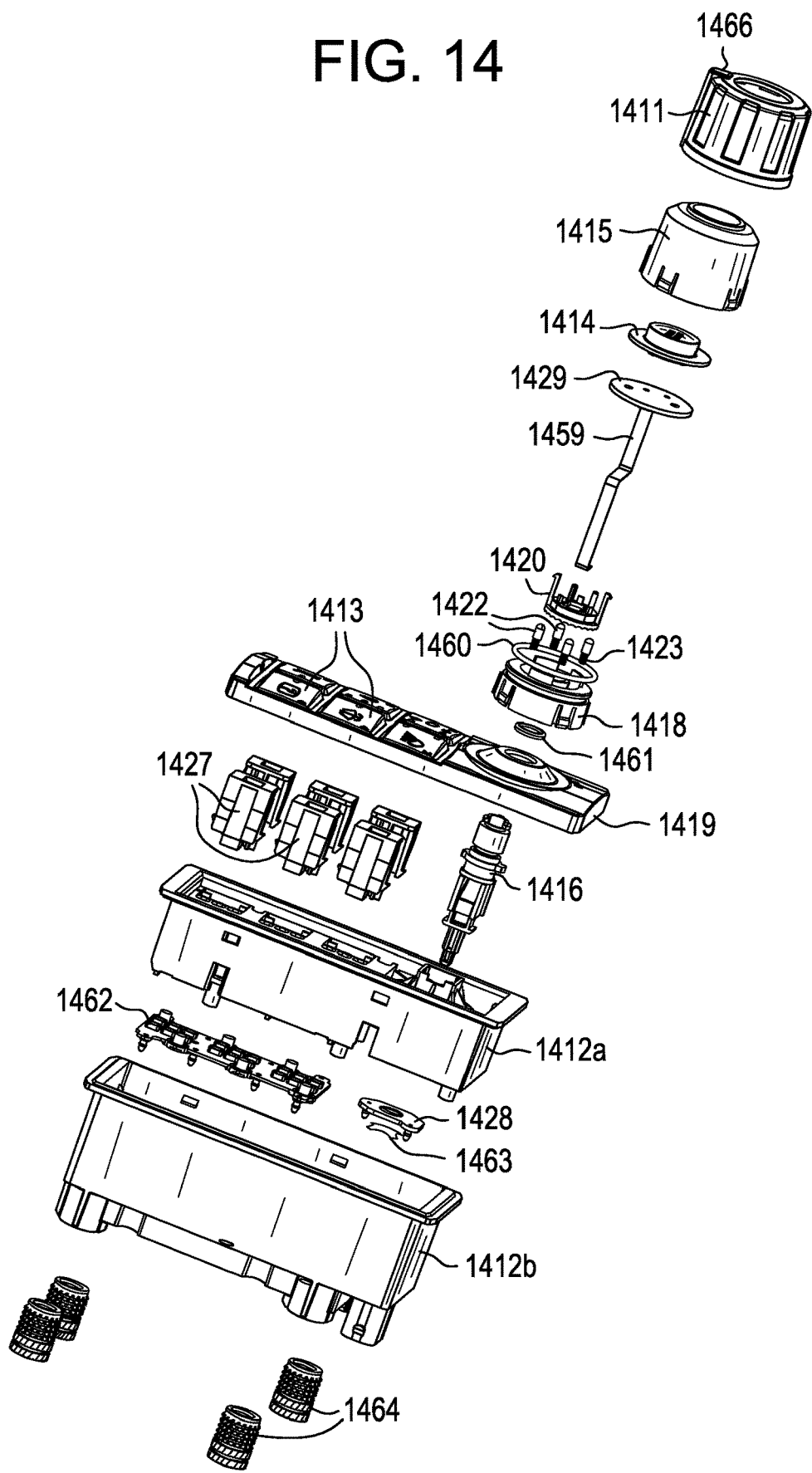
FIG. 14 is an exploded view of components of a multi-function controller that comprises an encoder in accordance with the present inventive subject matter.

FIG. 14 is an exploded view of components of a multi-function controller that comprises an encoder in accordance with the present inventive subject matter. The multi-function controller depicted in FIG. 14 comprises a handle element 1411 (in the form of a cap), a housing inner component 1412a, a housing lower component 1412b, pushbuttons 1413, an icon cap 1414 (which comprises an icon and a graphic light pipe for illuminating the icon), a lens 1415, a control element 1416 (in the form of a shaft), a first element (in the form of a support element) 1418, a first flexible mat 1419 (in the form of a silicone cover), a detent structure 1420 (with multiple detents on its underside), detent engaging elements 1422, springs 1423, keypad actuators 1427, a second flexible mat 1428, a second element (in the form of a printed circuit board) 1429 (with sensors), a flex cable 1459, a first O-ring 1460, a second O-ring 1461, a snap dome silicone mat 1462, a snap dome 1463, and threaded inserts 1464. The second flexible mat 1428 and the snap dome 1463 enable the handle element 1411 (together with the components within the handle element 1411), and the control element 1416 to be pressed downward relative to the housing sufficiently for the snap dome 1463 to complete an electrical connection between two or more electrically conductive regions, and the snap dome 1463 pushes the control element 1416 (along with the handle element 1411 and the components within) back up after the downward pressing force is removed, in addition to providing a tactile response to assist a user in recognizing that the downward movement of the handle element 1411 has been received by the multi-function controller. Light emitters and light receivers are on the underside of the printed circuit board 1429, and occluders are provided on the first element 1418. A flex cable 1459 provides electrical connections to allow at least for power to be delivered to the light emitters and light receivers, for power to be delivered to the light pipe that illuminates the icon cap, and for signals generated by the light receivers to be conveyed. The first O-ring 1460 provides a seal between the detent structure 1420 and the first element 1418, and the second O-ring provides a seal between the first element 1418 and the first flexible mat 1419, to enhance resistance to ingress of water, dirt, dust, etc. The snap dome silicone mat 1462 is a silicone mat with snap domes associated with each of the keypad actuators 1427, whereby pressing of any of the pushbuttons 1413 creates a downward force that pushes the respective keypad actuator 1427 downward into the snap dome silicone mat 1462, causing the snap dome associated with that respective keypad actuator 1427 to make an electrical connection indicating that the pushbutton was pressed. The threaded inserts 1464 are provided for mounting the multi-function controller in a system or device in which it is being integrated (some of the components in the embodiment depicted in FIG. 14 have features in common with like-named components in the embodiment depicted in FIGS. 11, 12A and 12B and/or the embodiment depicted in FIG. 1, discussed above).

In the embodiment depicted in FIG. 14, or in any encoder in accordance with the present inventive subject matter, or in any multi-function controller that comprises an encoder in accordance with the present inventive subject matter, optionally, one or more components (e.g., one or more springs, or a resilient collar) can be included to cause a control element (e.g., the control element 1416) to return to its upright position when a force that caused the control element to be pushed down (or pulled up) is removed. For example, in the embodiment depicted in FIG. 14, upon discontinuing application of downward (in the orientation depicted in FIG. 14) force to the handle element 1411, the handle element 1411 is pushed back to its upward (in the orientation depicted in FIG. 14) position (e.g., in the embodiment depicted in FIG. 14, the snap dome 1463 permits the handle element 1411 to be pushed downward, and when the downward force is removed, the snap dome 1463 pushes the handle element 1411 back up).

The present inventive subject matter is also directed to methods of controlling systems. Such methods can comprise moving a first element (e.g., a handle element and/or a control element) rotationally and/or translationally, and optionally also: (1) tilting a handle element and/or a control element, and/or (2) moving a handle element and/or a control element substantially axially, and/or (3) pressing one or more pushbuttons, in any sequences or combinations. Such methods can further comprise thereby generating one or more signals indicative of the position of the first element relative to the second element, and/or a change in the position of the first element relative to the second element, and optionally also (1) one or more electrical signals indicative of tilting a control element in a particular direction, (2) one or more electrical signals indicative of pushing or pulling a control element, (3) one or more electrical signals indicative of pressing one or more pushbuttons one time or more, and combinations of any such actions.

While certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Each component described herein can be a unitary one-piece structure. In some cases, if suitable, two or more structural parts of the devices described herein can be integrated, and/or a component can be provided in two or more parts (which are held together, if necessary). Similarly, any two or more functions can be conducted simultaneously, and/or any function can be conducted in a series of steps.

The invention claimed is:

1. An encoder, comprising:
a first element,
a second element, and
a plurality of components,
the first element movable among a plurality of positions relative to the second element,
each position adjacent to at least one other position,
each component generates a signal at each of said positions, and
for every one of the plurality of positions, movement of the first element to any adjacent position results in a change in a signal from only one of said components.

2. An encoder as recited in claim 1, wherein:
each of said positions has a combination of signals from the components, and
each of said combinations of signals is unique.

3. An encoder as recited in claim 1, wherein:
each of said plurality of components comprises at least one light receiver,
at each of said positions, each of said plurality of components generates either a signal indicating that light exceeding a threshold brightness is received or a signal indicating that light exceeding the threshold brightness is not received.

4. An encoder as recited in claim 3, wherein:
said encoder further comprises at least one light emitter and at least a first occluder,
at least one of the components is on the second element, and
the first occluder is on the first element.

5. An encoder as recited in claim 3, wherein each of said plurality of components:
in each of a first group of said positions, the component generates a signal indicating that light exceeding the threshold brightness is received,
in each of a second group of said positions, the component generates a signal indicating that light exceeding the threshold brightness is not received, and
the number of positions in the first group of positions is equal to the number of positions in the second group of positions.

6. An encoder as recited in claim 3, wherein:
said plurality of components consists of three components,
said plurality of positions consists of between five and eight positions, and
for each of said plurality of positions, a combination of signals from said three components differs from combinations of signals from said three components in every other of said plurality of positions.

7. An encoder as recited in claim 1, wherein the first element is rotationally movable among a number of positions relative to the second element.

8. An encoder as recited in claim 1, wherein the first element is translationally movable among a number of positions relative to the second element.

9. An encoder as recited in claim 1, wherein the encoder further comprises a multi-detector element that comprises two or more sub-detectors that generate sub-signals, the sub-detectors spaced from each other a distance that is smaller than a distance between two of said positions.

10. A method of detecting a position of a first element relative to a second element, comprising:
moving a first element relative to a second element from a first position to a second position,
the first element movable relative to the second element among a plurality of positions, including at least the first position and the second position,
each position adjacent to at least one other position,
the first element and the second element configured such that for each and every one of the plurality of positions as an initial position, moving the first element relative to the second element from the initial position to an adjacent position causes exactly one of a plurality of components to generate a signal that differs from a signal it generated when the first element was in the initial position.

11. A method as recited in claim 10, wherein:
each of said plurality of components comprises at least one light receiver,
at each of said positions, each of said plurality of components generates either a signal indicating that light exceeding a threshold brightness is received or a signal indicating that light exceeding the threshold brightness is not received.

12. A method as recited in claim 10, wherein the movement of the first element from the first position to the second position comprises a rotational movement.

13. A method as recited in claim 10, wherein the movement of the first element from the first position to the second position comprises a translational movement.

14. A method as recited in claim 10, wherein the encoder further comprises a multi-detector element that comprises two or more sub-detectors that generate sub-signals, the sub-detectors spaced from each other a distance that is smaller than a distance between the first position and the second position.

* * * * *